United States Patent
Wu et al.

(10) Patent No.: US 8,406,476 B2
(45) Date of Patent: Mar. 26, 2013

(54) MODEL-BASED DEWARPING METHOD AND APPARATUS

(75) Inventors: Minghui Wu, Beijing (CN); Rongfeng Li, Beijing (CN); Wenxin Li, Beijing (CN); Edward P. Heaney, Jr., Long Beach, CA (US); Karl M. Chan, Huntington Beach, CA (US); Kurt A. Rapelje, Hawthorne, CA (US); Bin Fu, Beijing (CN); Bin Feng, Bellevue, WA (US)

(73) Assignee: Compulink Management Center, Inc., Long Beach, CA (US)

( * ) Notice: Subject to any disclaimer, the term of this patent is extended or adjusted under 35 U.S.C. 154(b) by 1034 days.

(21) Appl. No.: 12/281,315

(22) PCT Filed: Mar. 2, 2007

(86) PCT No.: PCT/US2007/005492
§ 371 (c)(1),
(2), (4) Date: Mar. 27, 2009

(87) PCT Pub. No.: WO2007/103251
PCT Pub. Date: Sep. 13, 2007

(65) Prior Publication Data
US 2010/0239165 A1    Sep. 23, 2010

Related U.S. Application Data

(63) Continuation-in-part of application No. 11/368,260, filed on Mar. 2, 2006, now Pat. No. 7,330,604.

(51) Int. Cl.
*G06K 9/00* (2006.01)
(52) U.S. Cl. .................. 382/112; 702/150
(58) Field of Classification Search .......... 382/100, 382/103, 101, 112, 181, 182, 190, 195, 199, 382/206, 276, 281, 289–292, 286, 287; 356/138; 702/150, 151
See application file for complete search history.

(56) References Cited

U.S. PATENT DOCUMENTS

| | | | |
|---|---|---|---|
| 4,783,833 A | 11/1988 | Kawabata et al. | |
| 5,280,367 A * | 1/1994 | Zuniga | 358/462 |
| 5,280,546 A | 1/1994 | Machida et al. | |
| 5,377,019 A | 12/1994 | Okisu et al. | |
| 5,515,181 A | 5/1996 | Iyoda et al. | |
| 5,585,962 A | 12/1996 | Dixon | |
| 5,677,776 A | 10/1997 | Matsuda et al. | |
| 5,742,354 A | 4/1998 | Vlahos et al. | |
| 5,764,228 A | 6/1998 | Baldwin | |

(Continued)

FOREIGN PATENT DOCUMENTS

EP    1571820 A2    9/2005

OTHER PUBLICATIONS

Daniel S. Le, George R. Thomas, Harry Wechsler, "Automated Page Orientation and Skew Angle Detection for Binary Document Images" Pattern Recognition, vol. 27, No. 10, pp. 1325-1344, 1994, Great Britain.

(Continued)

*Primary Examiner* — Anand Bhatnagar
(74) *Attorney, Agent, or Firm* — Dickstein Shapiro LLP

(57) ABSTRACT

An apparatus and method for processing a captured image and, more particularly, for processing a captured image comprising a document. In one embodiment, an apparatus comprising a camera to capture documents is described. In another embodiment, a method for processing a captured image that includes a document comprises the steps of distinguishing an imaged document from its background, adjusting the captured image to reduce distortions created from use of a camera and properly orienting the document is described.

11 Claims, 27 Drawing Sheets

U.S. PATENT DOCUMENTS

| | | | |
|---|---|---|---|
| 5,764,383 A | | 6/1998 | Saund et al. |
| 5,831,750 A | | 11/1998 | Okisu et al. |
| 5,848,183 A | | 12/1998 | Farrell |
| 6,011,635 A | | 1/2000 | Bungo et al. |
| 6,014,470 A | | 1/2000 | Matsuda |
| 6,064,778 A | * | 5/2000 | Pasco et al. ............. 382/289 |
| 6,134,346 A | | 10/2000 | Berman et al. |
| 6,282,326 B1 | * | 8/2001 | Lee et al. ............. 382/289 |
| 6,304,313 B1 | * | 10/2001 | Honma ............. 355/18 |
| 6,310,984 B2 | * | 10/2001 | Sansom-Wai et al. ....... 382/289 |
| 6,385,347 B1 | | 5/2002 | Matsuda |
| 6,430,320 B1 | | 8/2002 | Jia et al. |
| 6,453,056 B2 | | 9/2002 | Laumeyer et al. |
| 6,525,741 B1 | | 2/2003 | Klassen et al. |
| 6,630,938 B1 | | 10/2003 | Nanni |
| 6,633,332 B1 | | 10/2003 | Nay et al. |
| 6,687,420 B1 | | 2/2004 | Matsuda et al. |
| 6,716,175 B2 | | 4/2004 | Geiser et al. |
| 6,806,903 B1 | | 10/2004 | Okisu et al. |
| 6,839,463 B1 | | 1/2005 | Blake et al. |
| 6,873,732 B2 | | 3/2005 | Dance |
| 6,954,290 B1 | | 10/2005 | Braudaway et al. |
| 7,092,548 B2 | | 8/2006 | Laumeyer et al. |
| 7,121,469 B2 | | 10/2006 | Dorai et al. |
| 7,330,604 B2 | | 2/2008 | Wu et al. |
| 7,602,995 B2 | * | 10/2009 | Araki et al. ............. 382/290 |
| 2002/0044681 A1 | | 4/2002 | Fujimoto et al. |
| 2003/0026482 A1 | | 2/2003 | Dance |
| 2003/0048271 A1 | | 3/2003 | Liess et al. |
| 2003/0053692 A1 | | 3/2003 | Hong et al. |
| 2004/0012679 A1 | | 1/2004 | Fan |
| 2004/0022451 A1 | | 2/2004 | Fujimoto et al. |
| 2004/0099741 A1 | | 5/2004 | Dorai et al. |
| 2005/0053304 A1 | | 3/2005 | Frei |
| 2005/0175255 A1 | | 8/2005 | Fujimoto et al. |
| 2006/0045379 A1 | | 3/2006 | Heaney et al. |
| 2007/0206877 A1 | | 9/2007 | Wu et al. |
| 2007/0253031 A1 | | 11/2007 | Fan |

OTHER PUBLICATIONS

Aditya Vailaya, HongJiang Zhang, Changjiang Yang, Feng-I Liu, Anil K. Jain, "Automatic Image Orientation Detection", IEEE Transactions on Image Processing, vol. 11 No. 7, pp. 746-755, Jul. 2002.

Martin A. Fischler, Robert C. Bolles, "Random Sample Consensus: A Paradigm for Model Fitting with Applications to Image Analysis and Automated Cartography", Communications of the ACM vol. 24 No. 6, pp. 381-395, Jun. 1981.

Robert S. Caprari, "Algorithm for text p. up/dowm orientation determination", Patten Recognition Letters 2, Elsevier Science B.V., pp. 311-317, 1999 Australia.

Document Copy Stand and Digital Camera, Sky Mall Magazine, Late Spring 2004, p. 5, American Airlines.

Digital Presenter, NEC Projectors Web Site: DV11, http://www.nec-pj.com/products/dv/, (2005).

Patented Xerox Technology Could Turn Camera Phone into Portable Scanner, PhoneContent.com, http://www.phonecontent.com/bm/news/gnews/584.shtml, (2005).

Document Imaging With Cameras, Xerox website, http://www.xeroxtechnology.com/ip1.nsf/sedan1?readform&unid=6192C61923FED63885256FCC00691EEF, (2005).

Document Imaging With Cameras, Xerox Research Centre Europe, Mar. 2005.

Milan Sonka, Vaclav Hlavac, Roger Boyle: Image Processing, Analysis, and Machine Vision, Mar. 19, 2007, CL Engineering, XP002633279, p. 221.

Extended European Search Report dated Apr. 29, 2011 issued to European Application No. 08767496.6.

\* cited by examiner

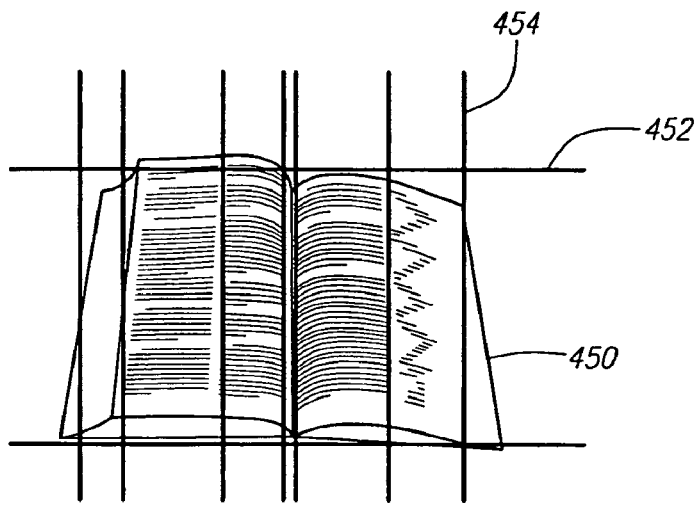
FIG. 25
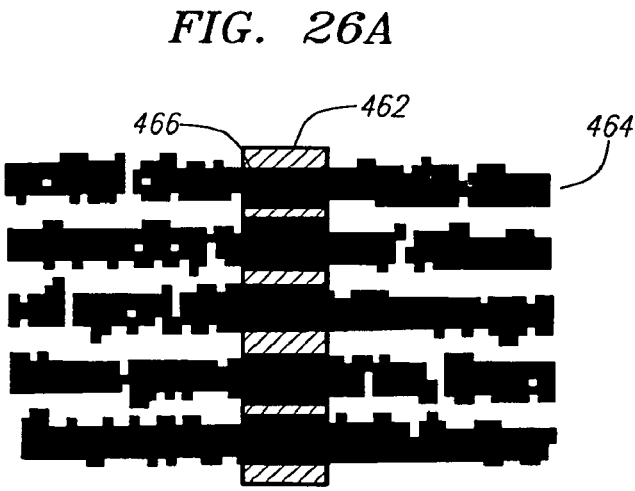
FIG. 26A
FIG. 26B

480 — word "Bosnia" will be mentioned at least once during the
the report about NASA. Even if it appears there for some
be much lower than in the report about Bosnia. The presence
detected using wordspotting algorithms (10). Although con
recess years, the problems relating to speaker dependence, fr
still remains but completely solved. We, therefore, choose to
test domain, that is, after transcribing the speech stream of a

3.1 The topic database prior to the news analysis process, a topic database is created
users current interest, which means that the database can
which can also be general enough so the no

*FIG. 28A*

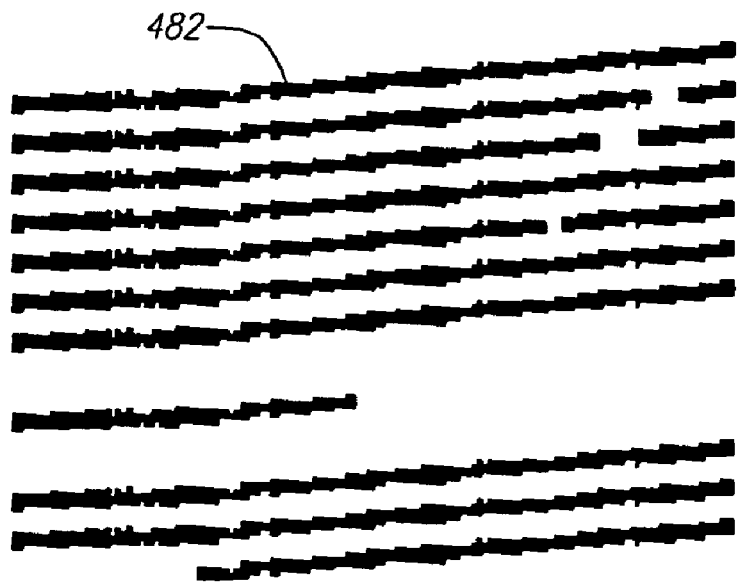

*FIG. 28B*

MODEL-BASED DEWARPING METHOD AND APPARATUS

This application is a 371 of PCT/US2007/005492 filed Mar. 2, 2007 which is a CIP of Ser. No. 11/368,260 filed Mar. 2, 2006 now U.S. Pat. No. 7,330,604. This application claims the benefit of U.S. application Ser. No. 11/368,260 filed Mar. 2, 2006, which disclosures are incorporated herein by reference.

FIELD

An apparatus and method for processing a captured image and, more particularly, for processing a captured image comprising a document.

BACKGROUND

More and more documents are stored in image, or pixel, format instead of ASCII code since storage media, such as CD-ROM, is becoming less expensive. These imaged documents are able to be used for reference, searching, or distribution. The stored image of the documents is usually captured by an input device such as a scanner or a digital camera. However, image distortion is a problem when the document content in the image is captured by a scanner or, even worse, by a digital camera.

FIG. 1-A is a block diagram depicting typical components of a scanner. A scanner is typically used to capture an image of a document 110. A document 110 is placed on the scanner plate 112. A scan head 120, which is generally comprised of an optical subsystem 122 and a charge-coupled device ("CCD") 124, is moved across the document 110. Although FIG. 1A depicts only a two dimensional view, the scan head 120 may move across the document in both the direction illustrated by arrow 114 and in a direction orthogonal to arrow 114. The optical subsystem 122 focuses light reflected from document 110 onto a CCD 124. CCD 124 is often implemented as a two-dimensional array of photosensitive capacitive elements. When light is incident on the photosensitive elements of the CCD 124, charge is trapped in a depletion region of the semiconductor elements. The amount of charge associated with the photosensitive capacitive elements is related to the intensity of light incident on the respective elements received over a sampling period. Accordingly, the image is captured by determining the intensity of incident light at the respective photosensitive capacitive elements via sampling the elements. The analog information produced by the photosensitive capacitive elements is converted to digital information by an analog-to-digital (A/D) converter 130. An A/D converter 130 may convert the analog information received from CCD 124 in either a serial or parallel manner. The converted digital information may be stored in memory 140. The digital information is then processed by a processor 150 according to control software stored in ROM 180. The user may control scanning parameters via user interface 170 and the scanned image is outputted through output port 160.

A block diagram of a digital camera is depicted in FIG. 1B. An optical subsystem 122 of a digital camera may be used to focus light reflected from a document 110 onto a CCD 124, much as in the scanner. In other digital cameras, devices other than a CCD are used to capture the light reflected from the image, such as CMOS sensors. In the context of a digital camera, as opposed to a scanner, the optical subsystem 122 is not moved along the surface of the document, as in a scanner. Rather, in a digital camera, the optical system 122 is generally stationary with respect to the object, such as a document, to be imaged. In addition to digital cameras, photographs captured from film-based cameras may also be digitized.

Cameras offer significant advantages over scanners for capturing document images and other images. For example, cameras are generally more portable than scanners. In addition, because scanners require a captured image to be placed on the scanner plate, cameras are capable of capturing a wider array of images than scanners. However, the use of cameras creates difficulties in image capturing that do not exist when using a scanner. For example, light conditions vary when using a camera, whereas the light conditions are generally controlled in scanners. In addition, use of a camera introduces image distortions, which may depend on various variables, such as the angle of the camera relative to the image, the lens used by the camera and its distance from the image, whether the image including a document is situated on a flat or curved surface and other factors. Because the scanner utilizes a moving scanner head, at a fixed distance from a document to be imaged, these distortions do not generally occur in scanners.

Much research has been done on solving the problem of image distortion. Brown and Seales proposed a general deskewing algorithm for arbitrarily warped documents based on 3D images. ("Image Restoration Arbitrarily Warped Documents," IEEE Transactions on Pattern Analysis and Machine Intelligence, Vol. 26, No. 10, (2004).) Zhang, et al. developed a depth-from-shading algorithm to process document images captured by a flatbed scanner. ("Restoration of curved Document Images Through 3D Shape Modeling," Proc. of the 6$^{th}$ International Conference on Document Analysis and Recognition, pp. 10-15 (2004).) But this technique is highly dependent on the lighting condition and, therefore, is not suitable for images captured with a digital camera.

Recognizing that digital cameras are more convenient input devices compared to scanners, researchers have developed models to reduce image distortion problems in images captured by digital cameras. For example, Cao, et al. developed a parametrical model to estimate the cylinder shape of an opened book. ("Rectifying the Bound Document Image Captured by the Camera: A Model Based Approach," Proc. of the International Conference on Document Analysis and Recognition, pp. 71-75 (2003).) A major limitation of using this technique is that the model only works when the lens plane of the camera lens is parallel to the surface of the imaged book. Liang, et al. have developed a developable surface to model the page surface of a book and exploit the properties (parallelism and equal line spacing) of the printed textual content on the page to recover the surface shape. ("Flattening Curved Documents in Images," International Conference on Computer Vision and Pattern Recognition, pp. 338-345 (June 2005).) By using this technique, the lens plane of the camera lens is no longer required to be parallel to the surface of a book. However, the models used by both Cao and Liang to correct the distortion on an imaged document are based on text line information. In other words, these models are highly dependent on the existence of text lines in the imaged book. If a page of a book has many pictures or equations instead of text lines, the Cao and Liang models will not work well.

Therefore, a need continues to exist for an improved apparatus and method for capturing images of documents that may utilize the advantages of cameras over scanners, yet reduces the distortion typically presented by capturing document images via a camera as opposed to a scanner. Preferably, the apparatus and method should be capable of reducing distortion in a captured image independent of whether text lines are present on the imaged document, thereby allowing for the correction of distortion in a captured image of document with pictures and equations. In addition, the apparatus and method preferably should not be restricted to images that are generated when the lens plane of a camera lens is parallel to the surface of a book.

BRIEF SUMMARY

An apparatus and method for processing a captured image that comprises an imaged document are described. In one embodiment, the apparatus comprises a stationary camera, which is utilized to capture the imaged document. In another embodiment, a non-stationary camera is utilized to capture the imaged documents. In yet another embodiment, a method for processing a captured image that includes a document comprises the steps of distinguishing the imaged document from its background, adjusting the captured image to reduce distortions created from use of a camera and properly orienting the document. In yet a further embodiment, an apparatus and method for dewarping a captured image of a curved document are provided.

BRIEF DESCRIPTION OF THE DRAWINGS

FIG. 25 depicts a thumbnail image for further illustrating a method for performing the text area segmentation step of FIG. 15.

FIG. 26A depicts a small segment of text image for further illustrating a method for performing the text line distance detection step of FIG. 16.

FIG. 26B depicts a thumbnail image for further illustrating a method for performing the text line distance detection step of FIG. 16.

FIG. 28A depicts a captured image of a document including lines of text used for further illustrating a method for performing the direction-matrix based enhancement step of FIG. 16.

FIG. 28B depicts an image of the skeleton of text lines that may be generated from the text lines in the image of FIG. 28A following the direction-matrix based enhancement step of FIG. 16.

DETAILED DESCRIPTION OF PREFERRED EMBODIMENTS

Embodiments described herein are operable to process an image captured from a camera that comprises a document. Embodiments described herein are operable to identify the captured document image from its background. After the captured document image is isolated from its background, embodiments described herein are operable to reduce or remove distortions of the captured document image. Embodiments described herein are also operable to rotate the captured document image to its proper orientation. Additionally, embodiments described herein provide the user with an evaluation of the success of implementing each of the steps in its various embodiments.

Figure 1A:
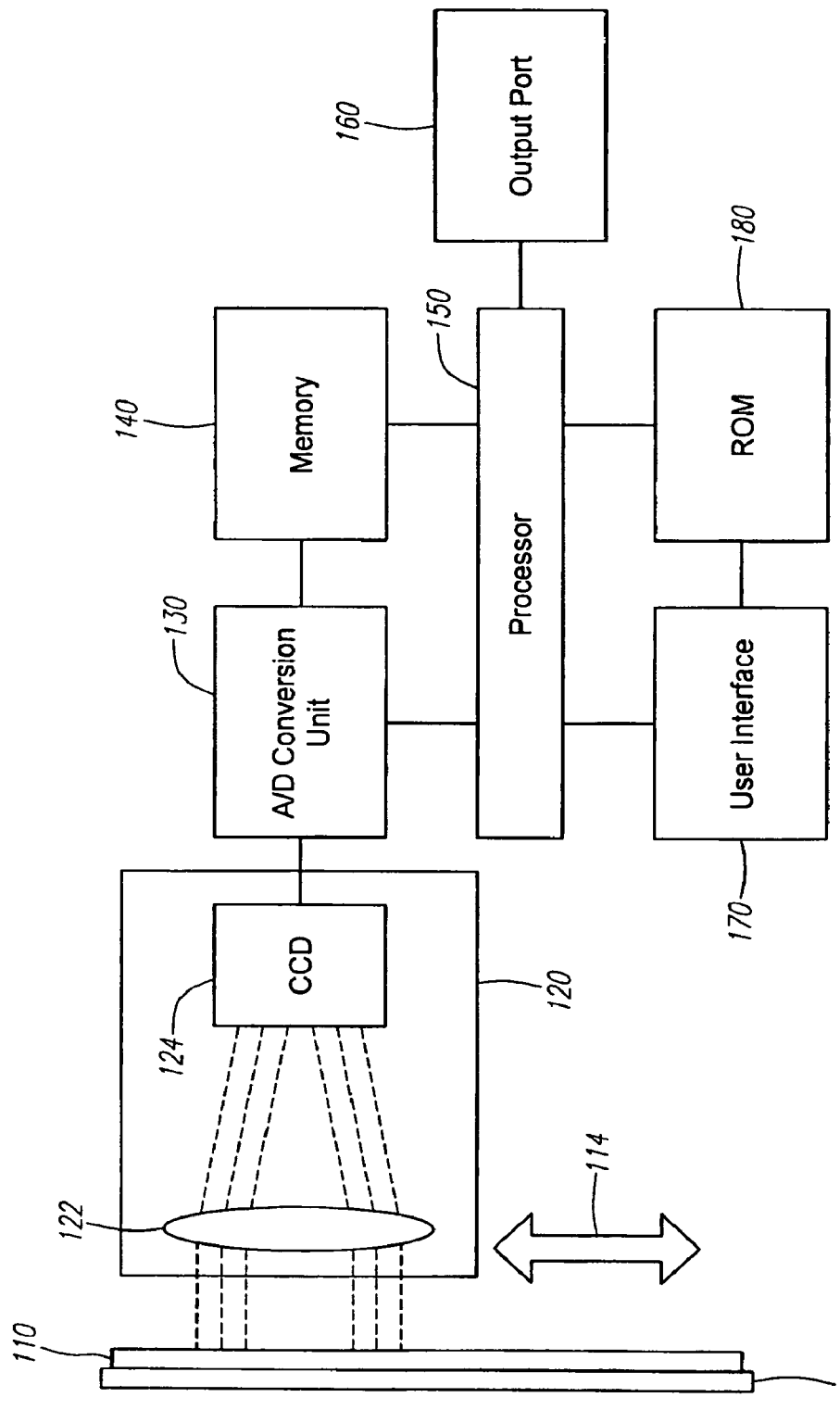
FIG. 1A depicts a prior art document scanner.
Figure 1B:
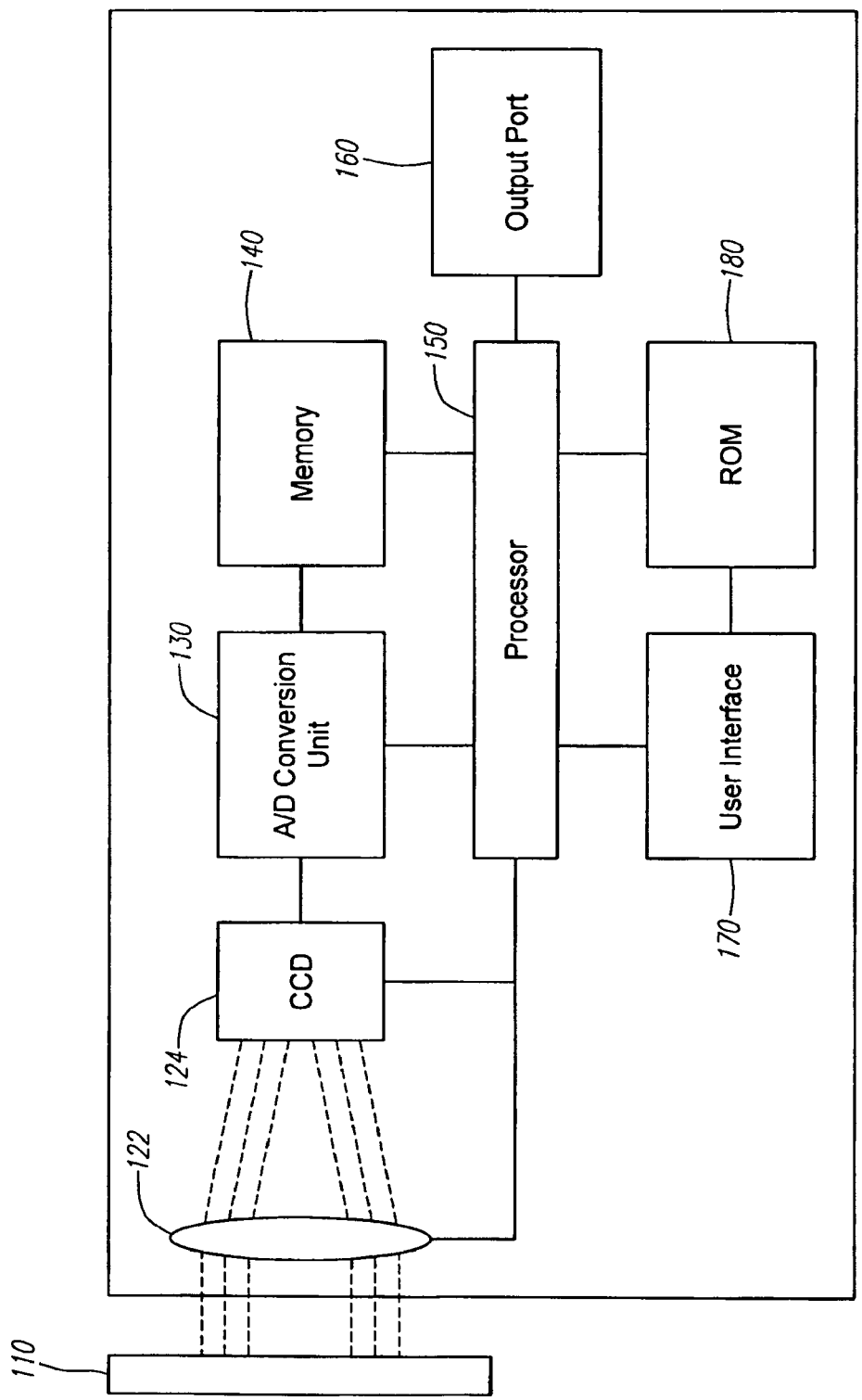
FIG. 1B depicts a prior art digital camera.
Figure 2:
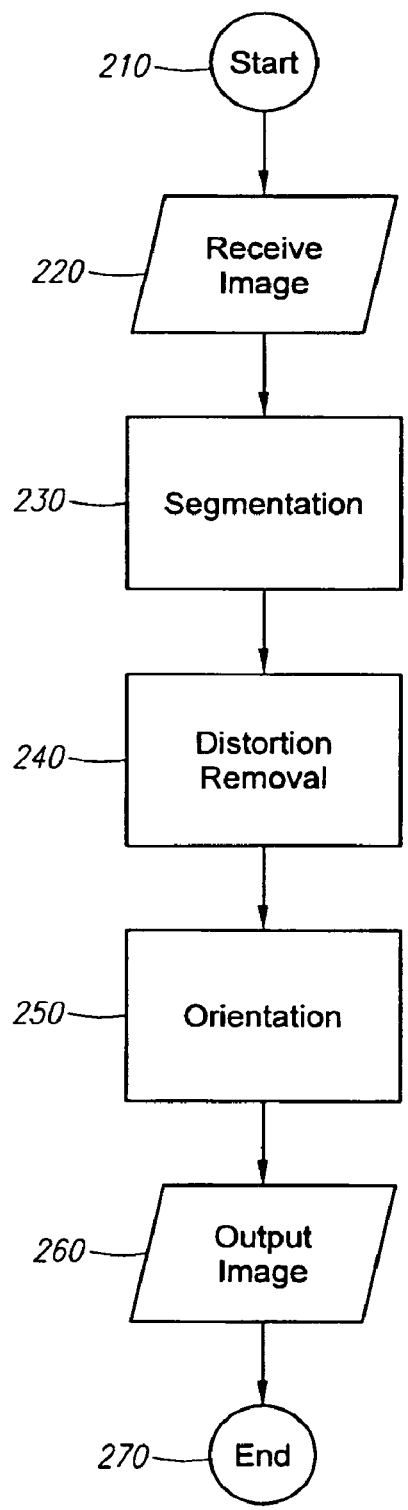
FIG. 2 depicts a general flowchart of a preferred method for processing a captured image.

FIG. 2 depicts a general flowchart of a preferred method for processing a captured digital image. After start 210, a digital image is received in step 220. The image received in step 220 comprises a document image. The digital image may be received from various sources. For example, in one embodiment, the image may be received from a digital camera. In another embodiment, the image may be received from a stationary unit comprising a digital camera. In yet another embodiment, the image may be received from a film photograph that has been digitized. In situations where the image has been previously captured by an electronic imaging device, the image may also be received from any of the known storage mediums for electronic files.

Step 230 operates to identify the captured document image from the remainder of the image, or the background. Step 230 is referred to as segmentation. This step 230 may operate to detect the edges of the captured document image. This step 230 may also operate to crop the background of the image from the captured document image so as to separate the document from its background. Step 240, referred to as distortion removal, operates to reduce or remove the distortions of the captured document image. Some of the distortions which this step 240 may operate to correct are perspective distortions, lens distortions, warping and light distortions. Other distortions may also be corrected in this step 240. Step 250 operates to correct the orientation of the document. This step 250 may operate to determine whether the captured document image should be in a portrait or landscape orientation and to rotate the captured document image accordingly. This step 250 may also operate to determine whether the captured document image is upside down and to rotate the captured document image accordingly. In step 260 the processed document image is outputted. The processed document image may be outputted 260 through various means, such as displaying an image of the processed document image on a monitor, saving the processed document image to a computer file, electronically transmitting the document image, or printing the processed document image.

In some embodiments, it may be desirable to perform fewer of the steps reflected in FIG. 2 or to reverse the order of certain steps. For example, some embodiments may only include distortion removal, or segmentation and distortion removal. In other implementations, it may be desirable to only perform the distortion removal and orientation steps.

Figure 3:
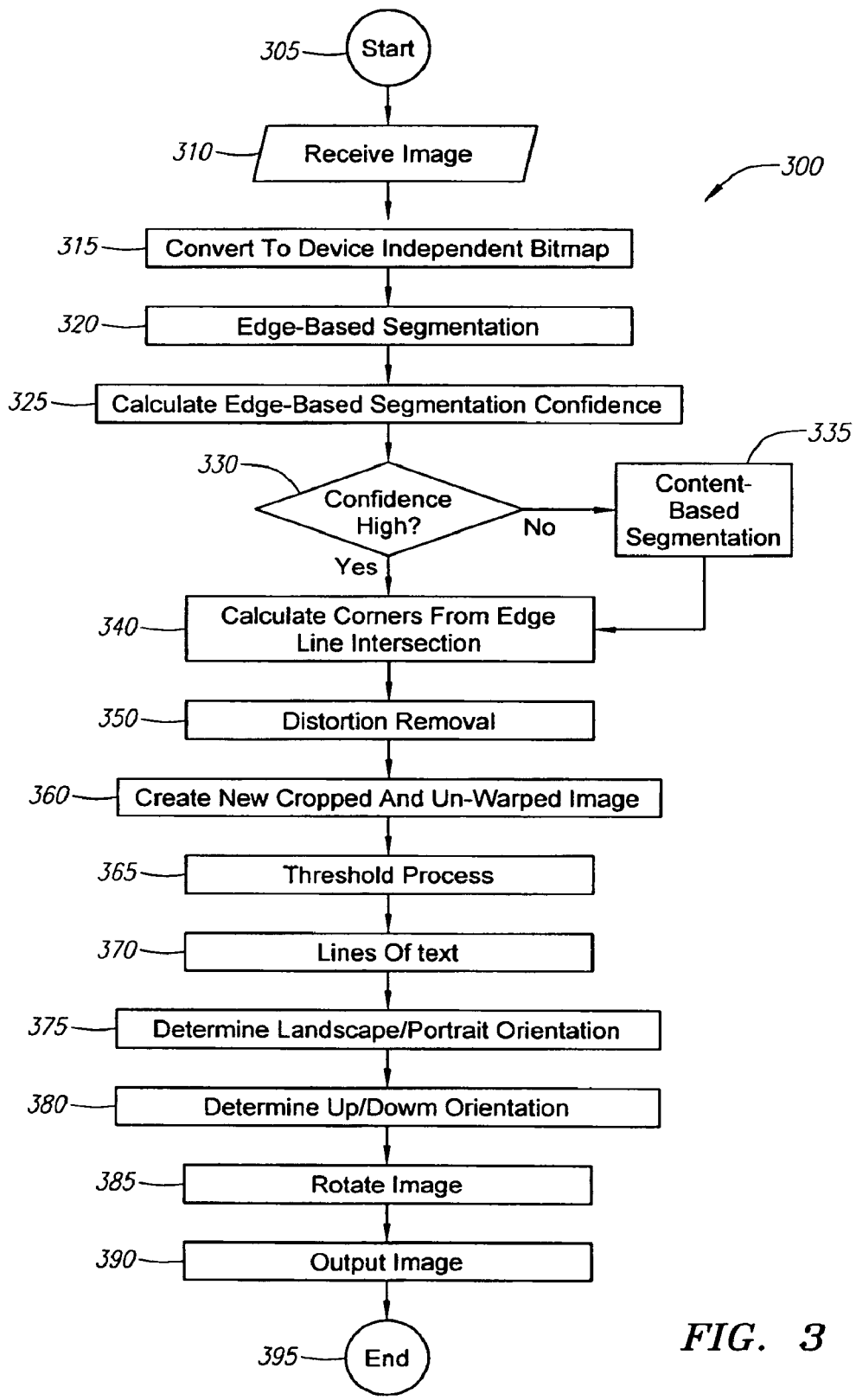
FIG. 3 depicts a flowchart of another embodiment of a method for processing a captured image.

FIG. 3 depicts a flowchart 300 of another embodiment of a method for processing a captured image. After start 305, the image is received in step 310. In step 315 the received image is converted into a device independent bit map. In step 320, segmentation is performed utilizing an edge-based segmentation process. The edge-based segmentation process 320 identifies the edges of the captured image document to distinguish the captured document image from its background.

Figure 4:
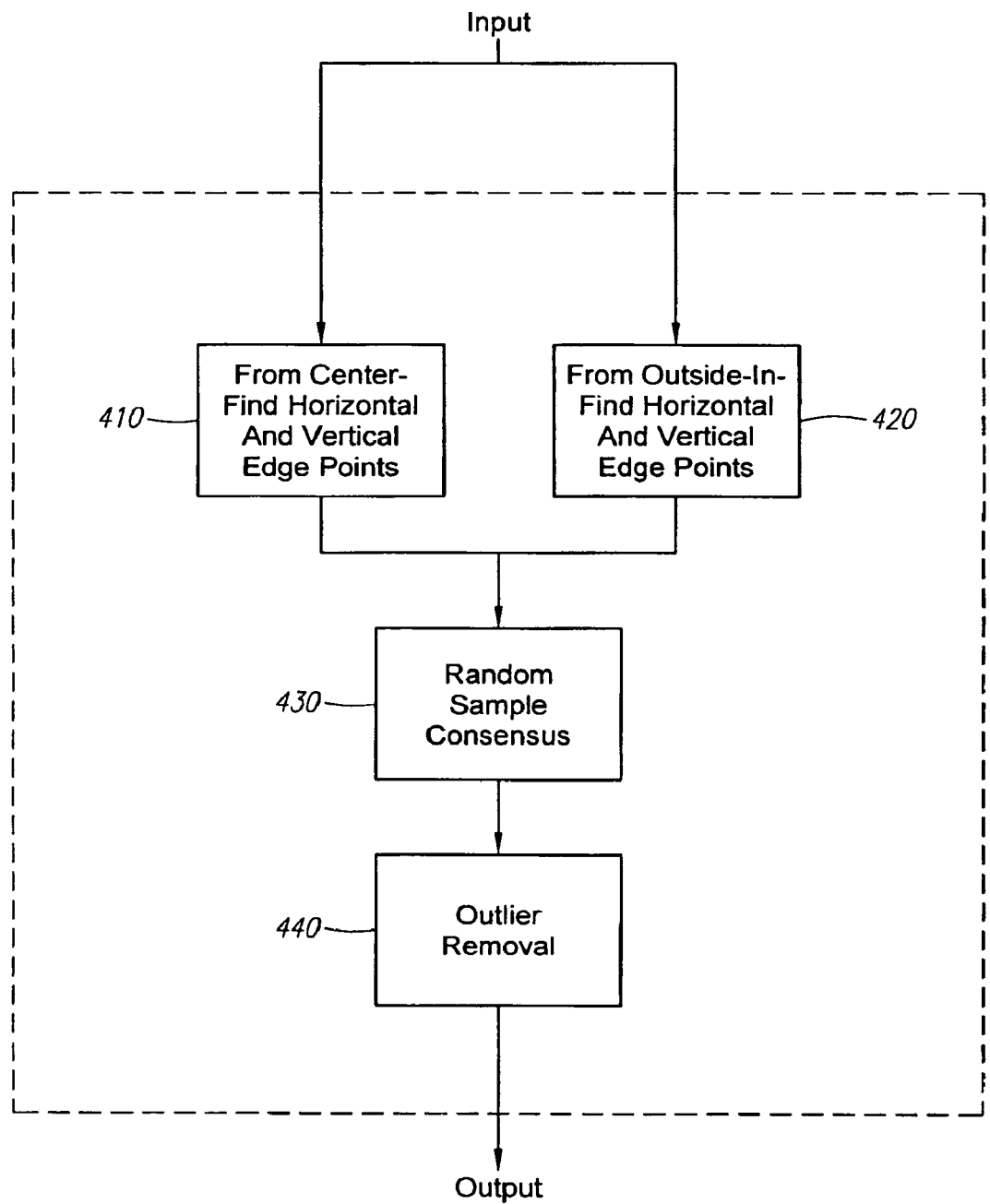
FIG. 4 depicts a flowchart of a method of performing segmentation in accordance with one of the implementations of the method of imaging a document disclosed herein.

FIG. 4 depicts a flow chart of one embodiment of an edge based segmentation process 320. In this embodiment, horizontal and vertical edge points are located. This is done by searching for edge points. Edge points are determined by identifying portions of the received image that contain a transition from the background portion of the received image to the document portion of the received image. In one embodiment, the received image is scanned beginning with the center of the received image 410 and also scanned beginning from the borders of the received image 420. In one embodiment, it is assumed that the document image occupies the center of the received image. In another embodiment, it is assumed that the non-text portion of the captured document image has a pixel intensity greater than that of its background. In the scanning beginning from the center of the received image 410, after finding an area that can be identified as document pixels, the transition to background pixels is searched along the scan. In the scanning beginning from the border of the received image 420, an area is identified as background pixels and the transition to document image pixels is identified. The process can be performed utilizing either one or both of these scans 410, 420. In one embodiment, the received image is scanned 410, 420 both in the horizontal and vertical direction.

Figure 5:
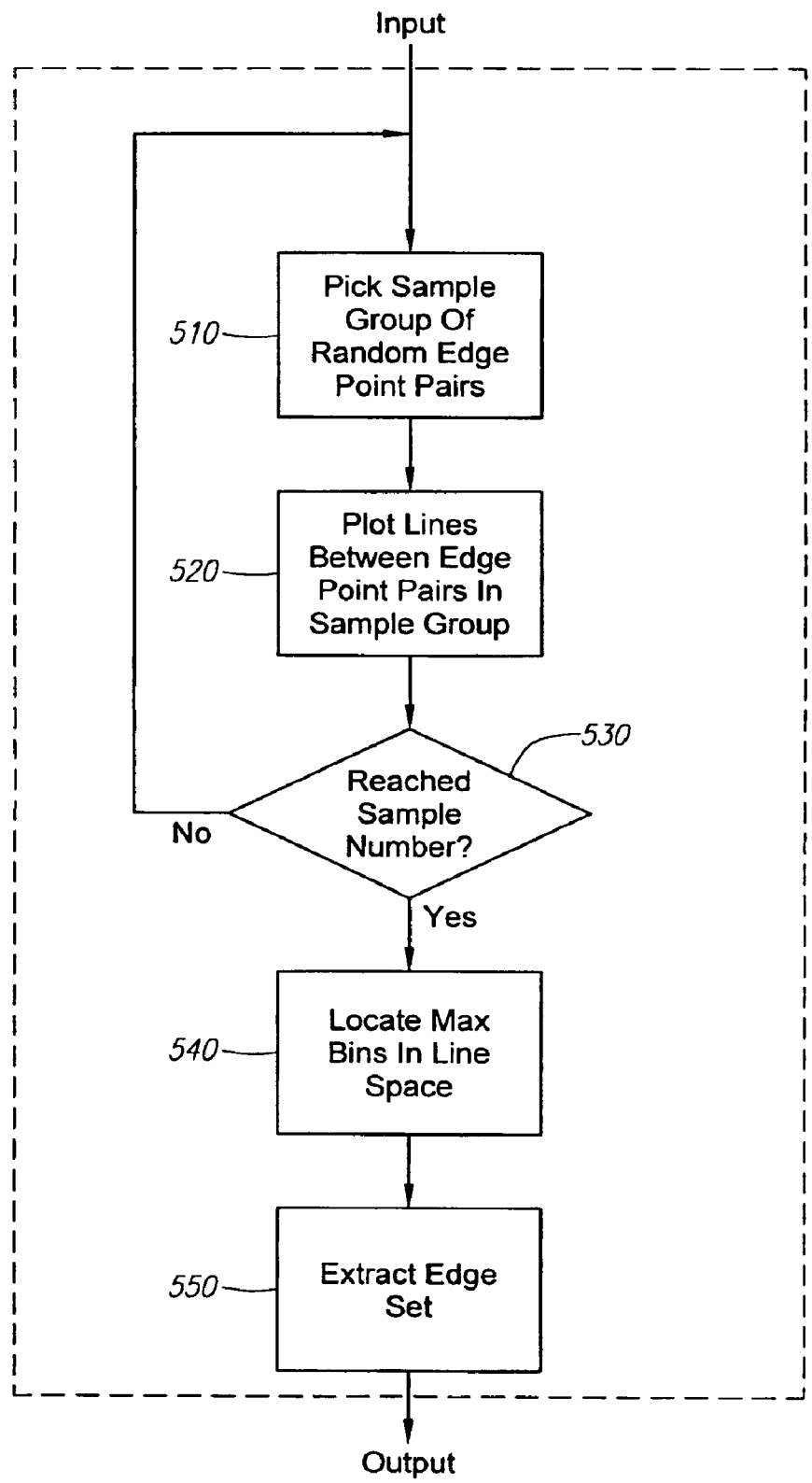
FIG. 5 depicts a flowchart of one method of performing the random sample consensus step illustrated in FIG. 4.

A random sample consensus step 430 is then performed. FIG. 5 depicts one embodiment of the random sample consensus step. In this embodiment, the random sample consensus 430 is executed by selecting two points at random 510 from the edge points selected in step 410 and 420. The line connecting these two randomly selected points is then calculated 520. In one embodiment, angle-distance coordinates are used, where the angle value corresponds to the angle of the line segment around the center of the received image and the distance value corresponds to the distance from the center of the received image to the nearest point in the line segment. In other embodiments, other coordinate systems may be used, including, for example, Cartesian coordinates or polar coordinates. These values are then stored. The process of selecting two random points from the edge points obtained in 410 and 420 is repeated to obtain a sufficient sample group 530. In one embodiment, this process is repeated five thousand times, though different sample sizes may be used. After the sampling, the pairs of points that all lie on the same line are grouped in bins. If the initial edge points selected in 410 and 420 accurately represent the edges of the document in the received image, approximately one quarter of the points will be distributed into four small ranges corresponding to the four document edges, while the remaining points will be spread generally uniformly over the rest of the possible coordinates. The four sets of grouped line segments that have the most grouped line segments 540 and meet a minimum threshold of grouped line segments are identified as representing the four edges of the document in the received image 550. In one embodiment, these collection of line segments are then determined to be the left, right, top and bottom edges according to their relative positions in the received image.

Figure 6:
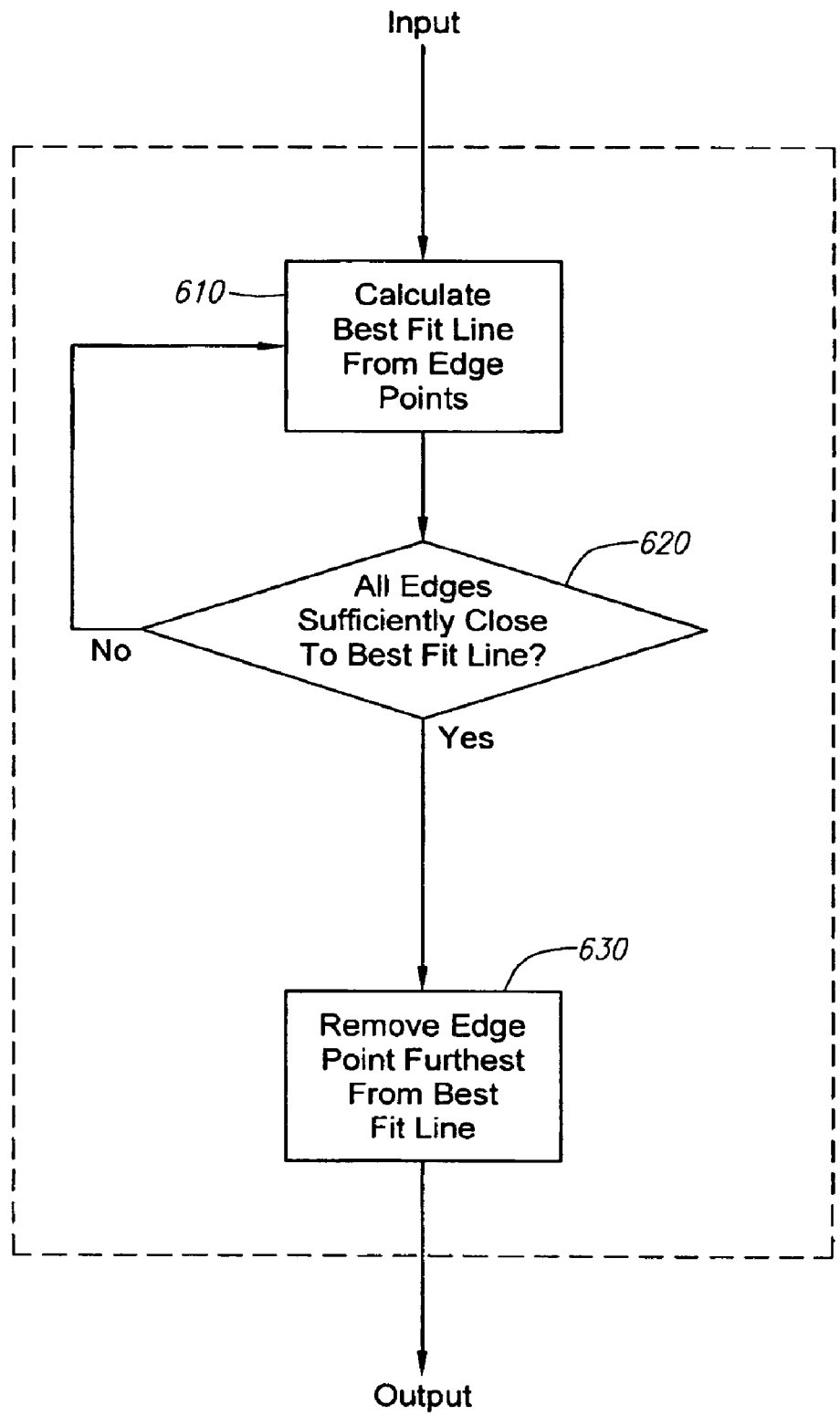
FIG. 6 depicts a flowchart of one method of performing the outlier removal step illustrated in FIG. 4.

After random sample consensus 430 is performed, in one embodiment, an outlier removal step 440 is performed among the collection of edge points to further refine the identification of the document edges. In one embodiment, depicted in FIG. 6, this is performed by conducting a linear regression between the collection of edge points corresponding to one of the edges of the received document image. In a linear regression technique, a line is drawn attempting to most accurately connect the collection of edge points 610. If the point furthest from this linear regression line is determined to be a distance sufficiently far from the linear regression line 620, the point is removed 630 and a new linear regression is performed. This process is repeated until the farthest point from the linear regression line is within a threshold value and the resulting linear regression line is determined to be the edge line. This is performed on each of the four collection of edge points representing the four edges of the received image document.

Referring back to FIG. 3, in step 325, a calculation of the accuracy of the identification of the edge lines from the edge-based segmentation 320 is determined. This step 325 may be referred to as the calculation of the confidence. In one embodiment, the confidence is calculated for each edge of the received document image and the lowest value is determined to be the overall confidence. In another embodiment, the highest confidence value among the edge lines is determined to be the overall confidence. In yet another embodiment, a combination of the confidence of the edge lines is used, such as for example an average of the confidence for the line edges, to determine the overall confidence. One embodiment for calculating the confidence of the determination of a particular line edge is to calculate the ratio between the number of pixel points remaining in that edge's collection after outlier removal 440 and the total number of pixel points that could have been found on that edge. The confidence determination can be used to improve the distortion removal 240, 350 of the received document image and can also be used to inform a user of the accuracy of the performance of the system for a particular received image.

In one embodiment, if edges of a document and text in the image cannot be found, the processor is programmed to assume the image is a non-document image and leaves it unaltered. The benefit of using this embodiment is the ability to detect when there is no document in the provided image at all. This is useful because this embodiment can be used to process a series of images that contain a mixture of pictures of documents and the type of pictures for which people otherwise use their cameras everyday, such as pictures of people or scenery. Detecting the absence of a document means that those pictures will not be distorted. In step 330, if the confidence in the edge-based segmentation step 320 is not sufficiently high, then a content-based segmentation of step 335 may also be performed. Alternatively, content-based segmentation may be the only type of segmentation performed.

Figure 7:
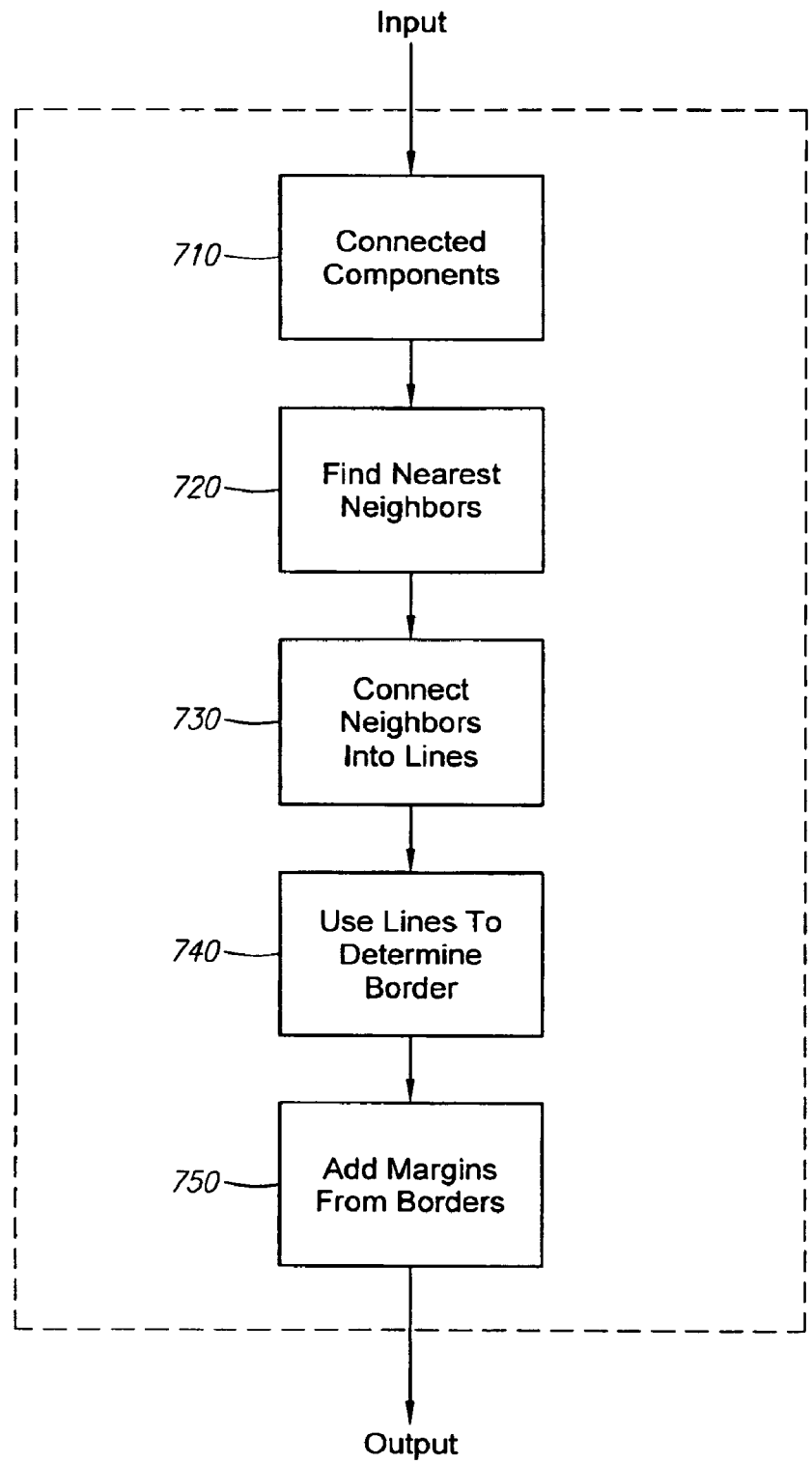
FIG. 7 depicts a flowchart for another method of performing segmentation in accordance with the method of imaging a document disclosed herein.

The content-based segmentation step 335 uses the text of the captured image document to calculate the edge of the captured image document in relation to the text. One embodiment of a content-based segmentation process is depicted in FIG. 7. In the content-based segmentation process of FIG. 7, segmentation is accomplished by identifying connected components in the received document image 710 and finding the nearest neighbor to those components 720. A connected component refers to a set of pixels in the image where each pixel is black or dark and each is adjacent to at least one other pixel in the set. The centers of the connected components are then connected into lines 730, which are then used to determine the border of the text 740. From these borders, a margin is added 750 in order to identify the location of the edge of the received document image. Although the size of the margin may vary, in one embodiment, a standard margin is added in step 750.

Referring back to FIG. 3, in step 340 the corners of the captured document image are calculated. In one embodiment, the corners may be calculated from the intersection of the edge lines.

As previously described, the distortion removal steps 240, 350 may involve a variety of adjustments to the received image. In one embodiment, the distortion removal step 240, 350 will adjust the received document image to correct for perspective distortions in the received image. For example, in situations where the picture is not taken at an angle directly above and centered upon the document, there will be a perspective distortion of the received document image.

Figure 8:
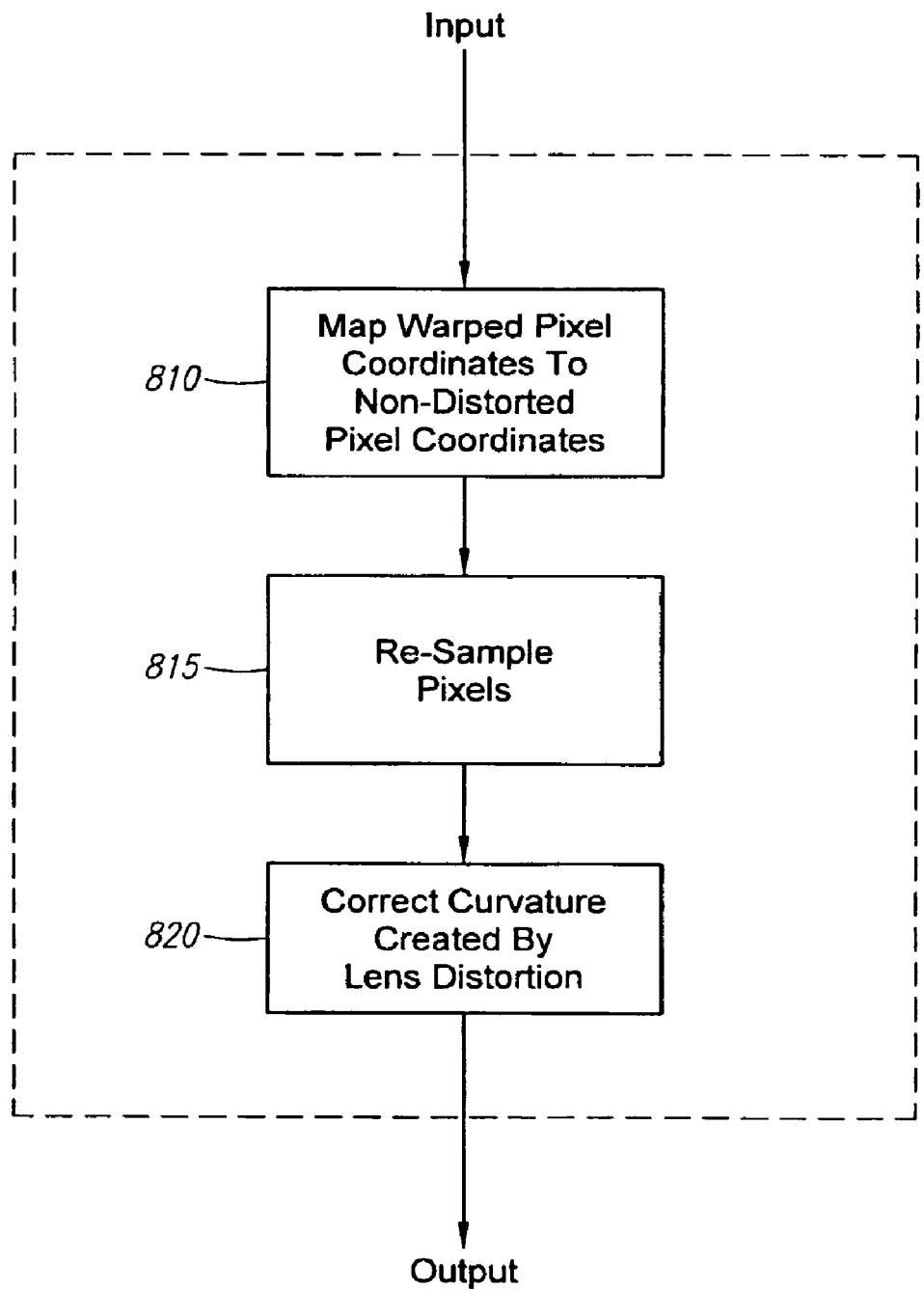
FIG. 8 depicts a flowchart of one method of performing the distortion removal steps illustrated in FIG. 2 and FIG. 3.

One embodiment for adjusting the image to correct for perspective distortion is depicted in FIG. 8. This embodiment involves mapping a set of image coordinates 810, for example (x, y), to a new set of image coordinates, for example (u, v). After the segmentation step 230, 320, 335, the four corners of the document are determined 340. Typically, in a document containing perspective distortion, these four corners will correspond to a trapezoid, whereas a document should generally have the shape of a rectangle. Thus, in one embodiment, the mapping 810 is performed between the received trapezoid to the desired rectangle. One embodiment for accomplishing this mapping 810 is to utilize a homogeneous transformation between the non-distorted pixel coordinates and the distorted pixel coordinates via a homogeneous matrix representing the transform from the distorted pixel coordinate to the non-distorted pixel coordinate, which is known in the art. The transform can be calculated by comparing the four corners determined during segmentation 230, 320, 335 with a corrected dimensions of the non-distorted received document image. In one embodiment, the need for calculating the transform at each pixel point can be avoided by simply calculating the transform for each line and utilizing linear interpolation to calculate the new pixel coordinates. After mapping new coordinates corresponding to a document having a reduced perspective distortion, a re-sampling of the pixels is performed 815.

Another aspect of the received image that may be adjusted in the distortion removal steps 240, 350 is an adjustment for distortions caused by the camera lens 820. The distortion caused by a camera lens may create otherwise straight lines to curve. This distortion depends on the particular lens used and the distance of the camera from the captured image. The curvature created by lens distortion will generally be radial and, therefore, a uniform radial adjustment for the lens distortion can be performed using a parameter approximating the degree of lens distortion. This parameter may be either calculated by the system or inputted by the user.

Yet another aspect of the received image that may be adjusted in the distortion removal steps 240, 350 is an adjustment for more than one distortions. For example, if the imaged document is a page of a book as shown in FIG. 18, the imaged page may have a curved surface, resulting in a curvature or warping distortion. Also, there may be a perspective distortion when the imaged document is captured at an oblique angle to the page. These distortions may both be corrected in the distortion removal steps 240, 350. A detailed description of a preferred embodiment for dewarping captured images of books and other documents and, if required, removing perspective distortion from such images, is described in connection with FIGS. 14-22 below.

Other distortions may also be corrected and the description of particular types of distortion herein is not intended to limit the types of distortion that may be reduced or removed.

In step 365, a thresholding process is performed on the image created in step 360. The thresholding process 365 reduces the color depth of the image and has the potential advantage of reducing the distortion created by a flash that may be used when photographing the image. In one embodiment, the thresholding process 365 reduces the twenty-four bit color images to one bit black-and-white images. The potential benefits of reducing the images to black and white is the reduction of the effects introduced by the camera's flash and the reduction of the amount of information required by the system 300 to process. The thresholding 365 can be performed in a number of ways. One embodiment may utilize a dithering technique, which is known in the art. An example of a dithering technique may be found in existing image software, such as the SNOWBOUND® IMAGE LIBRARY by Snobound Software Corporation. One shortcoming of using a dithering technique, however, is the introduction of noise into the image. Another embodiment for thresholding 365 involves selecting a global threshold for an image. In such a technique, a threshold value is selected. Those pixels having an intensity greater than the threshold value are deemed white and the remaining pixels are deemed black. The threshold value may be selected in a number of ways. In one embodiment, the threshold value is selected and applied for all received images. This technique has the shortcoming of not accounting for the varied lighting conditions in the received images. In another embodiment, the threshold value is calculated from an analysis of the received image, such as its histogram. In one such embodiment involving the analysis of the received image, an assumption is made that the received image contains two peaks in its intensity histogram corresponding to the foreground and background of the received document image. This embodiment may not perform well for those images to which the assumption does not apply. Another embodiment for thresholding 365 is to select a separate threshold value for each pixel in the received image. This embodiment has the advantage of responding to changing conditions within the document, such as lighting changes or background contrasts. One embodiment of this technique is referred to as adaptive thresholding. In this embodiment, the previous pixel values are considered as each new pixel is analyzed for determination of the threshold value. One way to accomplish this is by calculating the weighted average of each pixel as each progressive pixel of the received image is analyzed. One potential shortcoming of this embodiment is the introduction of noise if the received image comprises a colored document.

Figure 9:
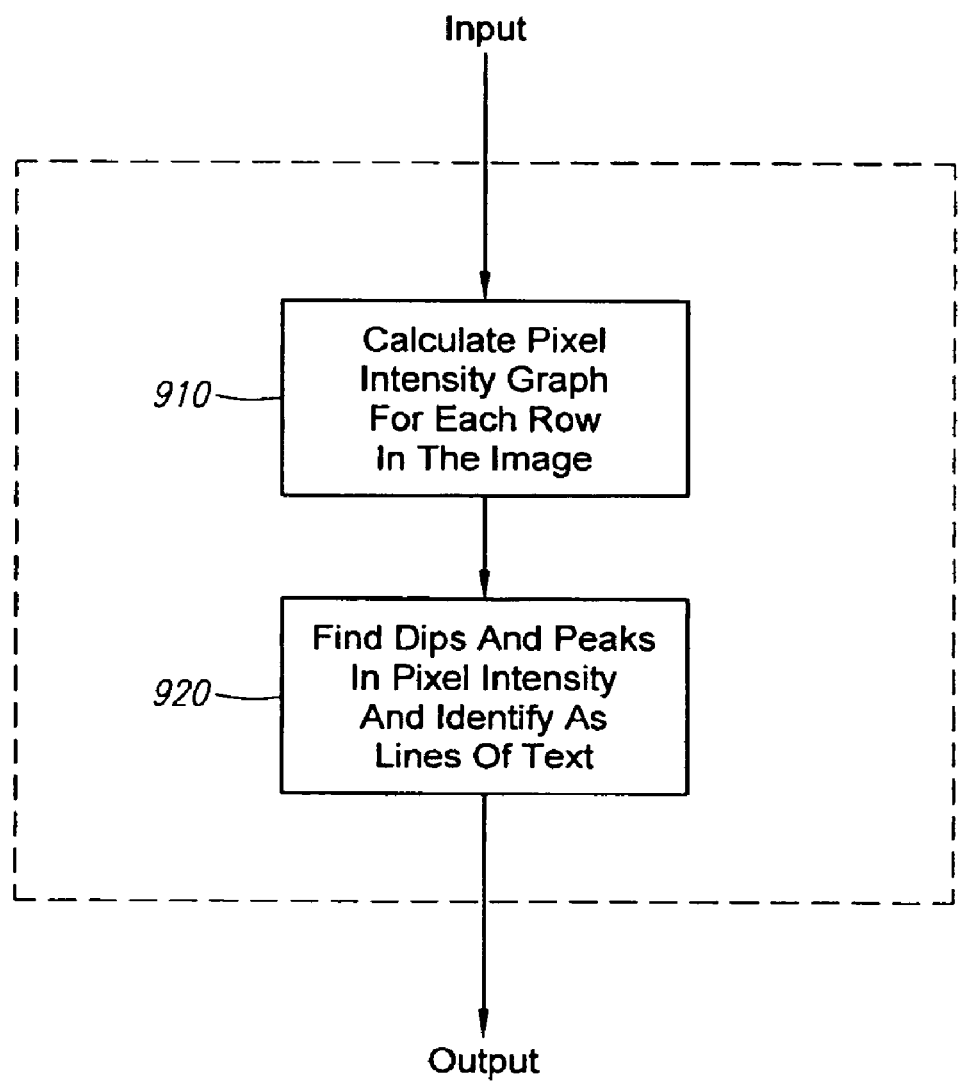
FIG. 9 depicts a flowchart of one method of performing the lines of text step illustrated in FIG. 3.

In step 370 the lines of text step is performed. In this step 370, the system determines the lines of text in the received document image. FIG. 9 depicts one embodiment of the lines of text 370. In one embodiment, the system assumes that the pixels corresponding to text in the received document image have a lower intensity than the background pixels of the received document image. In this embodiment, the sum of the intensities of all of the pixels within each of the rows of the received document image is calculated 910. These sums are then used to identify local peaks and valleys in the pixel intensity 920. These peaks and valleys are then analyzed to determine the lines of text in the document. For example, if the received document image has black lines of text with a white background, the lines of pixels that are entirely white will have the highest total intensities and the lines containing the black text will have substantially lower pixel intensity. These differences in intensity can then be calculated and the lines of text can thereby be determined. In a preferred embodiment, the lines of text step 370 is executed both horizontally and vertically across the received document image.

Another embodiment for performing lines of text step 370 is to perform a similar search for the lines of text as that performed in step 335. In one such embodiment, the text of the captured document image is identified and formed into lines. This may be accomplished by identifying the connected components in the captured document image and finding the nearest neighbor to those components. A connected component refers to a set of pixels in the image where each pixel is black or darker and each is adjacent to at least one other pixel in the set. The centers of the connected components are then connected into lines. This process is similar to that described in steps 710, 720 and 730 of FIG. 7.

Step 375 determines whether the captured document image should be in a landscape or portrait format. In one embodiment, this is accomplished by determining whether the adjacent connected components form predominantly vertical or horizontal lines of text. The process is run once where lines of text grow out from connected components, in either the horizontal or vertical directions, depending on the direction of the adjacent connected components. In one embodiment, the direction resulting with the greater number of lines is determined to define the received document image's orientation. For example, in a received document image that has a height greater than its width, if the lines of text 370 in the vertical direction yields a greater number of lines than the lines of text 370 in the horizontal direction, then the received image document is determined to have landscape orientation. As another example, if in the same received image document the lines of text 370 in the horizontal direction yields a greater number of lines than the lines of text 370 in the vertical direction, then the received image document is determined to have a portrait orientation.

Figure 10:
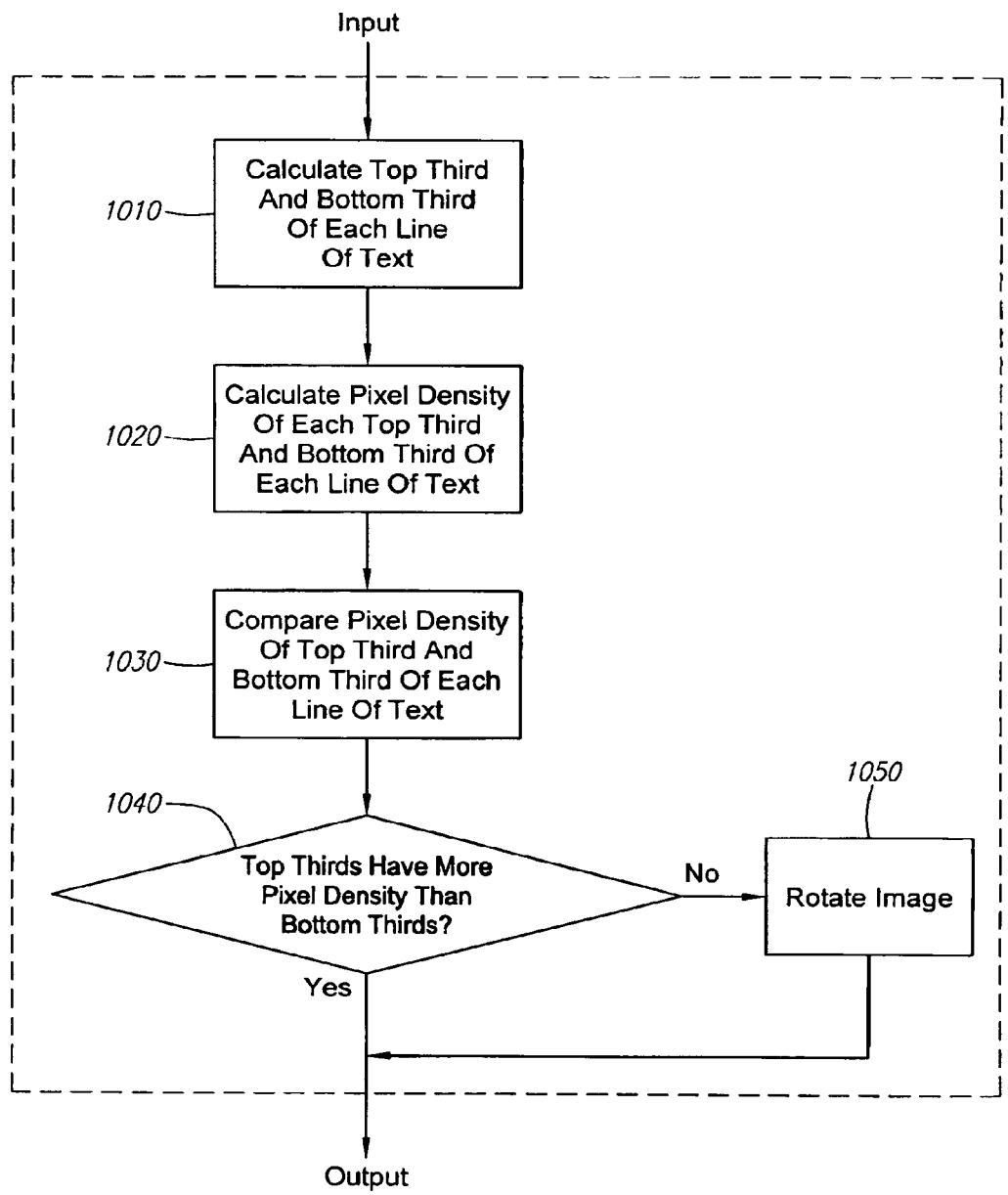
FIG. 10 depicts a flowchart of one method of determining whether a document is properly oriented in an upright manner in accordance with one implementation of the method of imaging a document disclosed herein.

Step 380 determines the upright orientation of the document. FIG. 10 depicts one embodiment of determining whether the received document image is properly oriented upright. In one embodiment, each line of text is analyzed. A fewer number of lines of text may be analyzed, but this may result in a less reliable result. In one embodiment, each line of text is divided into three sections in step 1010: an ascending section, a middle section and a descending section. English language characters contain certain inherent statistical characteristics that may be used in certain embodiments to determine the upright orientation of the received document image. For example, the English language alphabet has only five characters that descend below the bottom boundary of a sentence (i.e. g, j, p, q and y) and has many more characters that ascend above the top boundary of a sentence (e.g. b, d, f, h, i, k, l and t). In one embodiment, this characteristic of the English language characters can be considered when calculating the respective number of pixels contained in the ascending section and the descending section 1020 and comparing those pixel densities 1030, 1040. For example, a received document image having English language characters that has more ascending character pixels than descending character pixels is likely in the upright position and does not need to be rotated, whereas if the same document has more descending character pixels than ascending character pixels, the document likely needs to be rotated one-hundred and eighty degrees in step 1050.

In other embodiments, other characteristics of English language characters can also be considered. For example, characteristics of pixel location in the horizontal direction can be considered. Further, non-statistical methods can also be used to determine the upright orientation of the document, such as optical character recognition ("OCR"). Another embodiment could utilize a neural net approach. In addition, similar inherent characteristics can be utilized for non-English documents. For example, Spanish language characters are similar to those in English and will have similar inherent characteristics. As another example, Arabic language characters contain a greater number of descending characters and embodiments may adjust for those characteristics accordingly.

Figure 12:
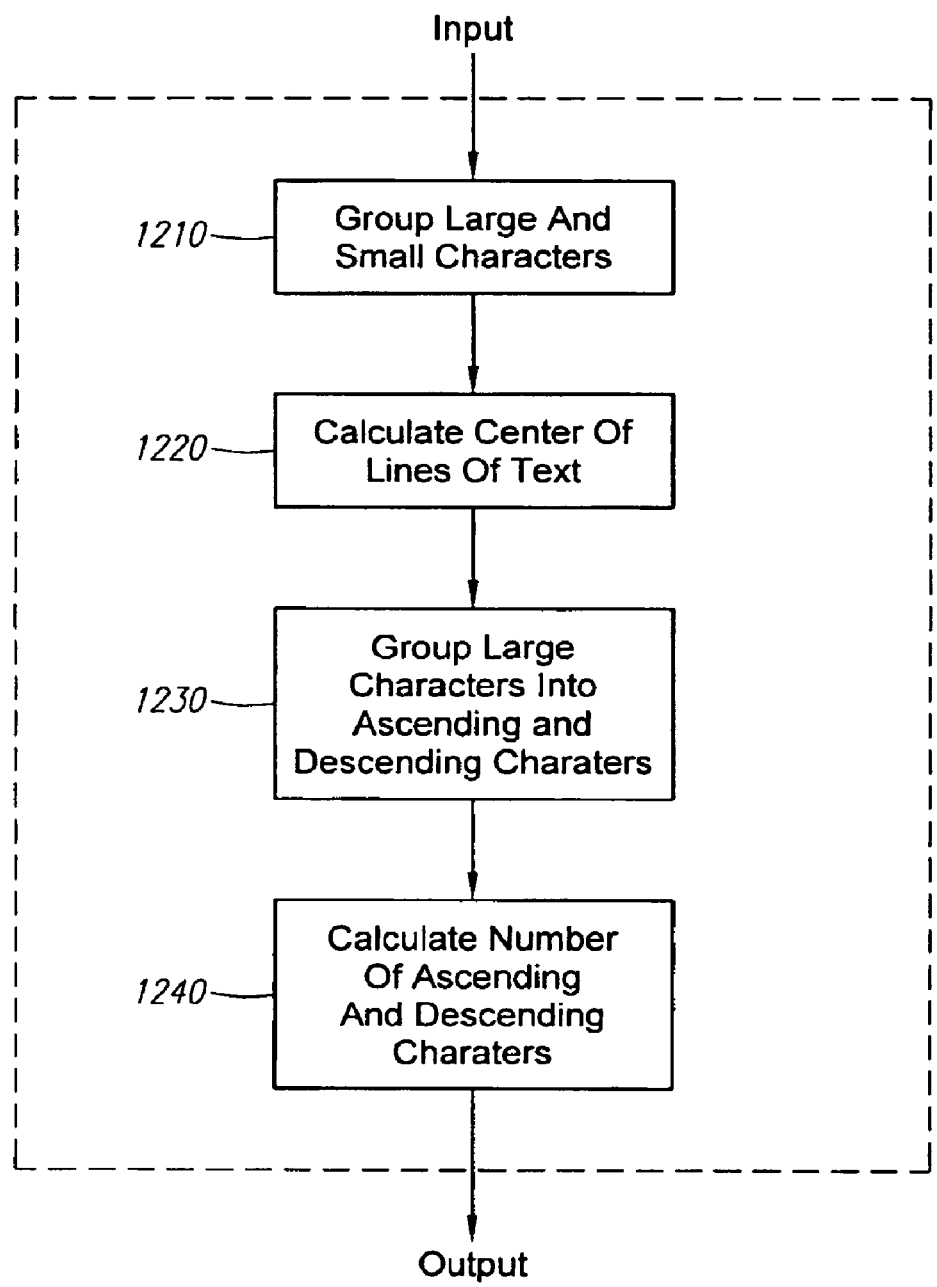
FIG. 12 depicts a flowchart of one method of determining whether a document is oriented in an upright manner in accordance with one implementation of the method of imaging a document disclosed herein.

FIG. 12 depicts another embodiment for performing step 380 and determining whether the received document image is properly oriented upright. In one embodiment, the connected components are used to determine each letter line of text. Each component is classified by height into two categories, small and large 1210. The center of the lines of text are then determined in step 1220. In one embodiment, the small letters' heights are used to determine the center of the line of text 1220. This may improve the estimate of the line-of-text's center if it is distorted, such as if it is curved across the page. The large letters are then matched against the center of the lines of text, and are grouped as ascending or descending based on the relative location to this center in step 1230. The total number of ascending and descending letters are then calculated in step 1240. In a typical English language document, the large characters will ascend towards the top of the page. Therefore, in one embodiment, if the number of ascending large characters is greater than the number of descending ones, then the document does not need to be rotated in step 385 prior to outputting in step 390. If, however, the number of descending large characters is greater than the number of ascending larger characters, then the document is rotated in step 385 prior to outputting in step 390.

The image is then rotated in step 385 according the determinations of steps 380 and 375. The new document image is then outputted in step 390.

Figure 11:
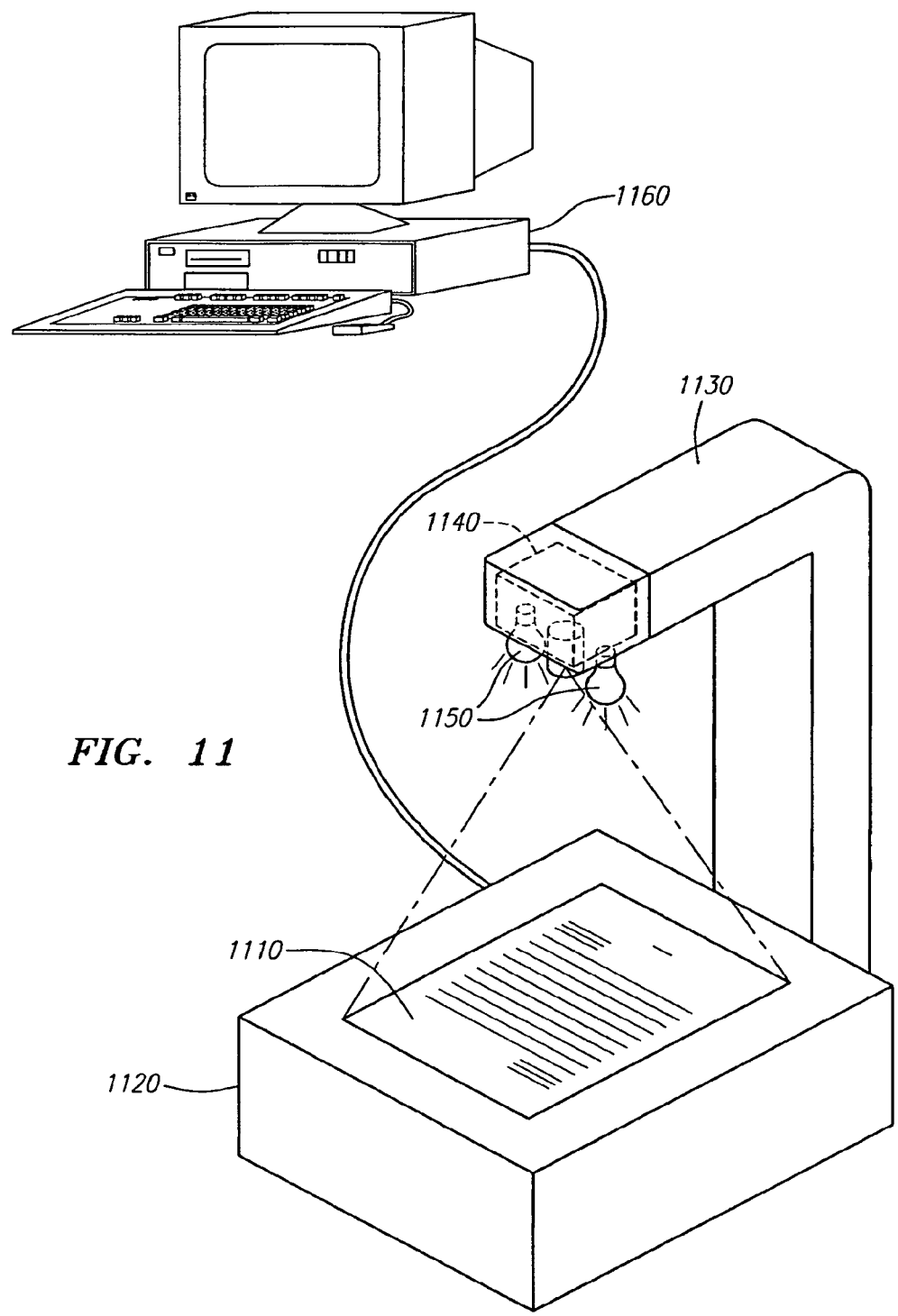
FIG. 11 depicts one embodiment of an apparatus for capturing and processing an image including an imaged document.

As discussed above, the system imaged documents may be captured in either a film camera or digital camera. As an alternative to these freeform devices, a stationary camera system may be employed to capture the imaged documents. FIG. 11 depicts an embodiment for a stationary camera system for capturing a document image. In this embodiment, the document 1110 is placed on the base 1120 of the system. In a preferred embodiment, the base 1120 of the system is of a pre-determined color, which may have the advantage of facilitating the segmentation process, discussed above. Extending from the base 1120 is the stand 1130, which may house a camera 1140 and lighting 1150. The camera and lighting may be permanently housed in the stand 1130 or may be removable or adjustable. The lighting may be placed anywhere on the base 1120 or stand 1130. In another embodiment, no additional lighting is included on the base 1120 or stand 1130. In still another embodiment, the lighting is separate from the base 1120 or stand 1130. The stationary system is then coupled to a computer 1160 to perform the above-described processing of the received image document. In another embodiment, the computer may also be built into the apparatus. In still another embodiment, the captured image document may simply be stored either in the digital camera 1140 or in another memory source and later coupled to a computer for processing. Such a stationary camera system can be placed as part of a user's workstation in, for example, an office.

There are several advantages of utilizing a stationary camera system as opposed to a freeform camera. For example, in utilizing a stationary camera system, the amount of perspective distortion may be reduced, since the document is more likely to be perpendicular and centered with respect to the camera lens. In addition, another advantage may be to allow the system to better adjust for lens distortion, since the distance between the camera and the lens used will be known, thereby reducing the need to calculate or approximate these parameters. Another potential advantage would be to reduce the distortions created by a camera flash. In a preferred embodiment the lighting 1150 of the stationary system would be positioned so as to reduce glare and other distortions created by camera flashes.

Although the use of a stationary camera system may be desirable, such systems will not always be practical or available for many document imaging needs. Thus, a method of removing image distortion caused by a warped surface of an imaged document or book even when the image is captured at an oblique angle would be extremely useful. The dewarping process described below in connection with FIGS. 14-22 provides such a distortion removal process. A detailed description of a preferred embodiment for dewarping captured images of books and other documents and, if required, removing perspective distortion from such images, is described in connection with FIGS. 14-22 below.

Figure 14:
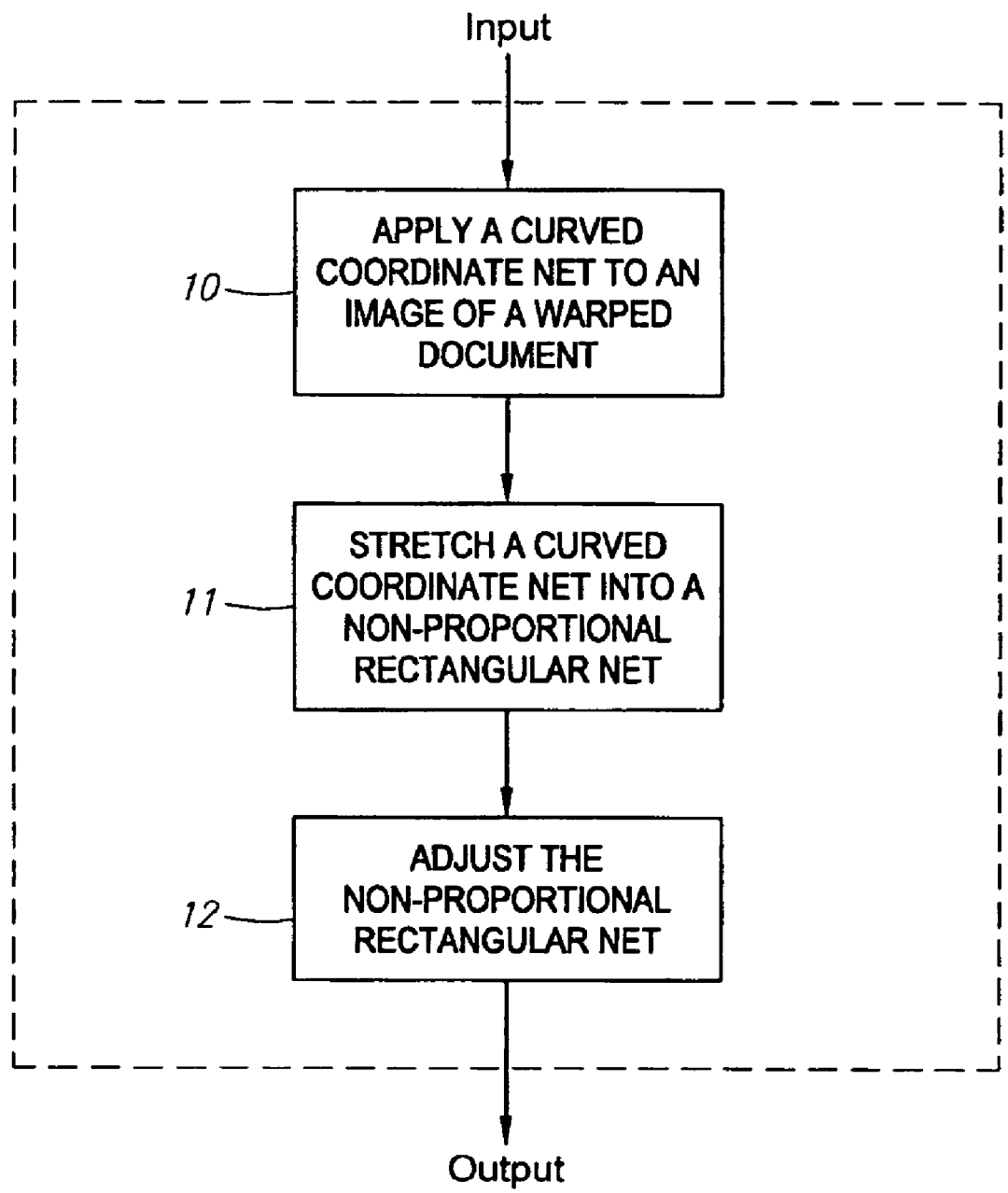
FIG. 14 depicts a flowchart of a method of performing image dewarping according to the present invention.

The dewarping process of FIG. 14 may be used for the distortion removal steps 240, 350 described above in FIGS. 2 and 3. Alternatively, it may be used as a stand-alone imaging processing technique, or combined with selected steps of the methods described in connection with FIGS. 2 and 3, including one or more of the steps of segmentation and image orientation.

Figure 18:
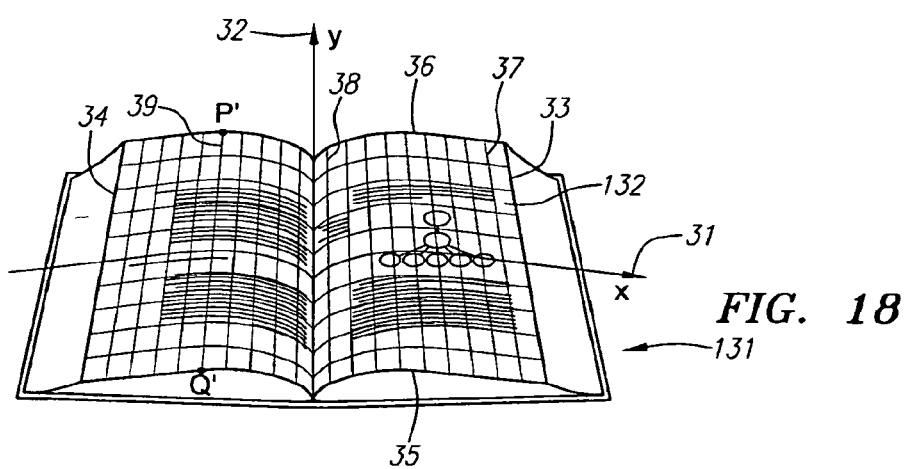
FIG. 18 depicts an example of an image of a warped document page with a curved coordinate net.
Figure 19:
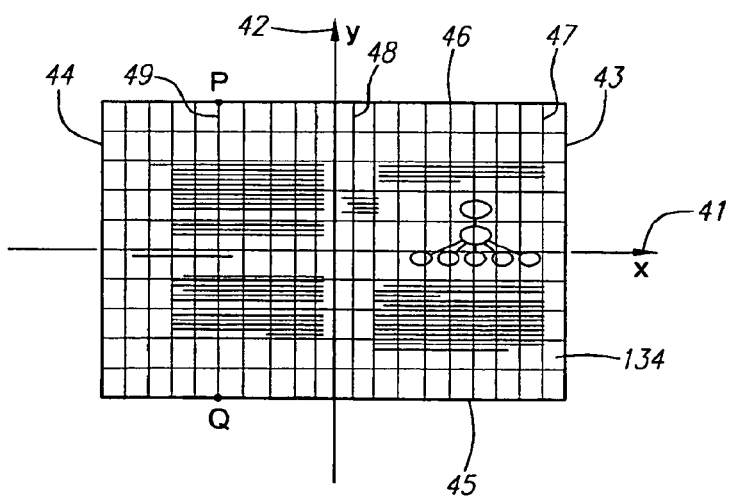
FIG. 19 depicts an image of a document with a stretched, non-proportional rectangular net produced after the stretching step of FIG. 14.
Figure 21:
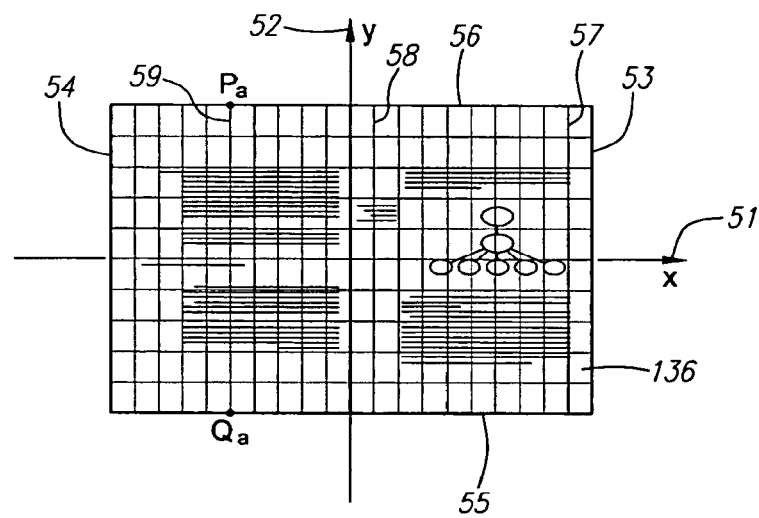
FIG. 21 depicts a rectangular net following the adjustment step of FIG. 14.

The dewarping process shown in FIG. 14 comprises three steps, which collectively transform an image of a warped document to a corresponding image of the flattened document. This is accomplished by transforming the imaged document from a curved coordinate system to a Cartesian coordinate system. In step 10 of this model-based dewarping process, a curved coordinate net 132, as best seen in FIG. 18, is applied to an image 131 of the warped document that is to be transformed. In step 11, the curved coordinate net 132 is stretched to form a rectangular coordinate net 134 as shown in FIG. 19. In step 12, rectangular coordinate net 134 in FIG. 19 is adjusted to generate an adjusted rectangular coordinate net 136 as shown in FIG. 21. Rectangular coordinate net 136 is preferably well-proportioned so that image distortion caused by warping of the document originally imaged and or due to the perspective of the camera is reduced, preferably substantially reduced, and more preferably completely removed.

Curved coordinate net 132 in FIG. 18 comprises line segments 33, 34, 37-39 and the y-axis 32. Line segments 33, 34, 37-39 are a portion of a series of concurrent, rather than parallel, straight lines that generally extend in the direction of the y-axis 32, but which intersect on a common vanishing point which is not shown since it is outside of the figure. Thus, in the illustrated embodiment, the concurrent line segments 33, 34, 37-39 are more separated from each other on their bottom portions and are spaced more closely to each other on their top portions. Further, because the degree of curvature is greater near the y-axis 32, which corresponds to the center of the imaged book, the space between line segments is greater the further they are away from the y-axis 32. Thus, the space between line segments 33 and 37 is greater than the space between the y-axis 32 and line segment 38. Although there are a number of methods that may be used for applying an appropriate curved coordinate net 132 to an image 131 of a warped document, two preferred methods are described below in connection with FIGS. 15-17. In one embodiment, the concurrent line segments 33, 34, 37-39 and the y-axis 32 of the curved coordinate net 132 are determined from the coordinates of the corners of the imaged book pages. The advantage of this technique is that it is independent of text in the captured image and thus allows pages that include images or formulas to be dewarped.

For each point in FIG. 18, its corresponding coordinate on a Cartesian coordinate system can be decided by finding its x and y coordinate, respectively, on the curved coordinate net 132. Further, every point on the same line segment (e.g., line segment P'Q' 39) in FIG. 18 along the y-axis 32, should have the same x-coordinate when recovered into a non-distorted image. Also, every point on the same curved line segment along the x-axis 31 in FIG. 18, should have the same y-coordinate in a non-distorted image. In one embodiment, the x-coordinate of each pixel on the imaged page is decided by drawing a line from the vanishing point through that pixel and intersecting with the bottom edge 35 of the book page in image 131. The distance between the intersection and the y-axis 32 is then the x-coordinate of that pixel.

Figure 20:
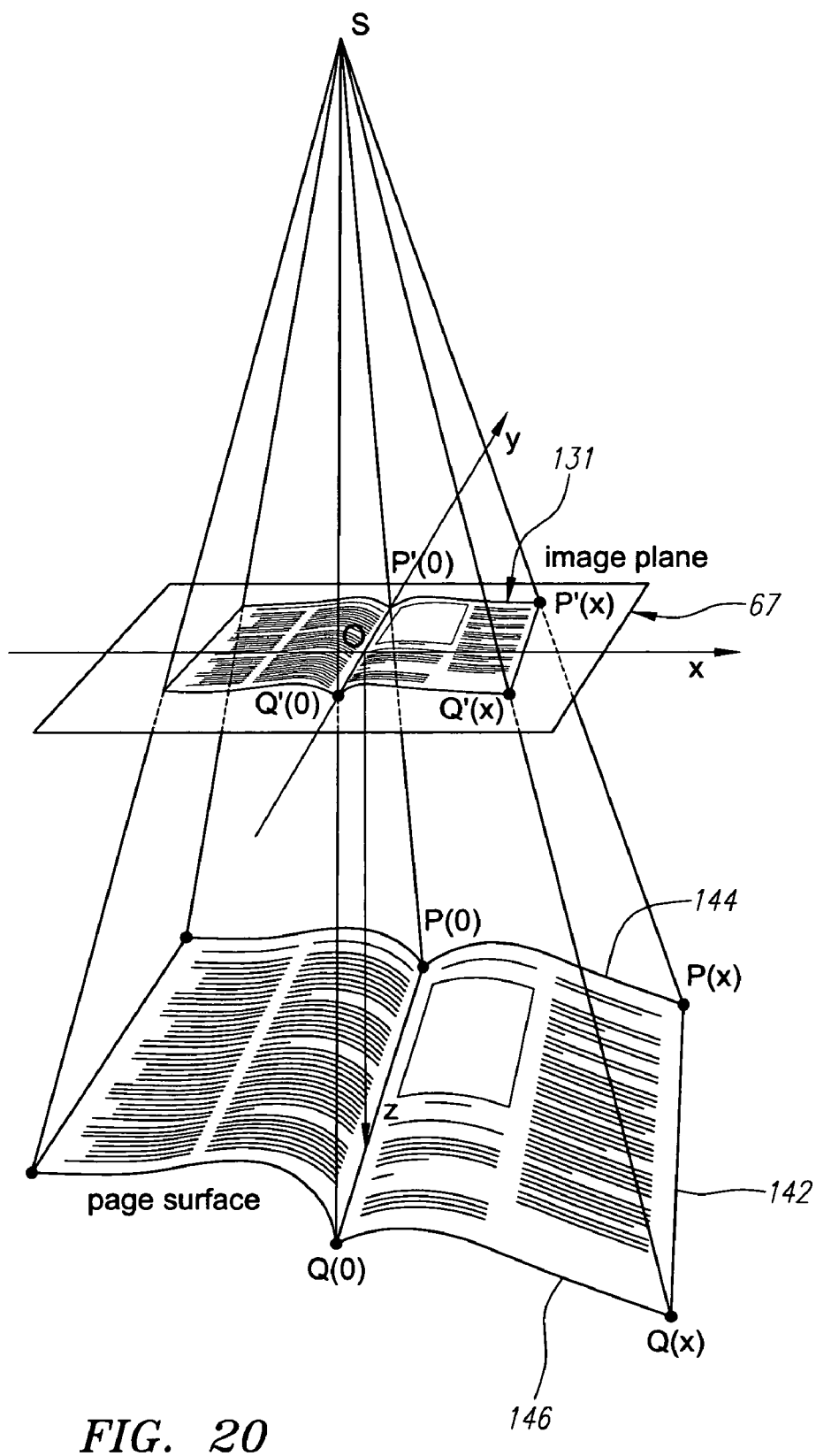
FIG. 20 depicts a projection diagram in 3D for illustrating the model used in a preferred embodiment of the present invention for performing the stretching step of FIG. 14.
Figure 22:
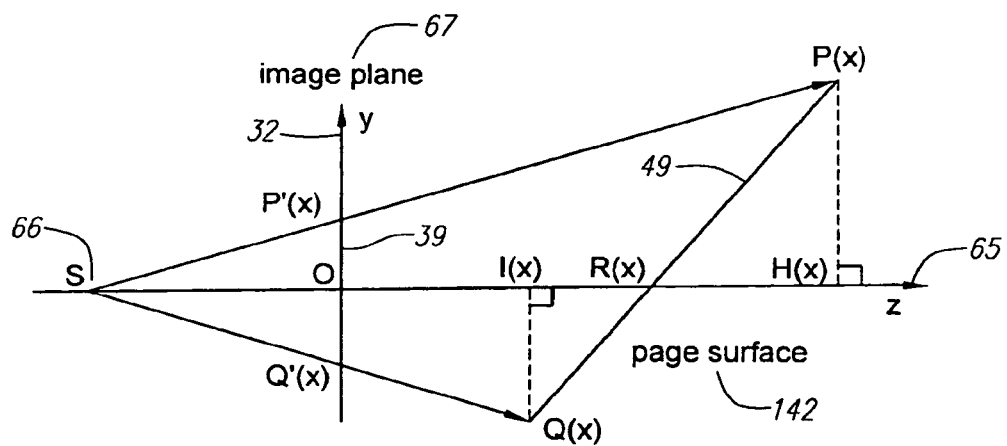
FIG. 22 depicts a projection diagram for further illustrating a preferred model for performing the stretching step of FIG. 14.

However, it is more complex to determine the y-coordinate of each pixel on the curved coordinate net 132. One method that may be used is to divide each of the concurrent straight-line segments 33, 34, 37-39 that extend in the direction of the y-axis 32 into many small sections. FIGS. 20 and 22 are useful in explaining this process. FIG. 20 depicts a projection of the book image in image 131 (shown in FIG. 18) on to the page surface 142 of the book that was imaged. Although points P(x) and Q(x) are located at two of the opposing corners of the page surface 142, it is to be understood that P(x) can be located at any point on the top curved edge 144 and Q(x) is located at the intersection of the line segment on which P(x) lies and the bottom curved edge 146 of the page surface 142. The same applies to P'(x) and Q'(x) shown in image 131.

FIG. 22 is a side view of the projection for line segment P'Q' 39 on the curved coordinate net 132 in FIG. 18 to corresponding line segment P'Q' 49 on the page surface 142 of the imaged book. Thus, line segment P'Q' 39 in FIG. 22 is on the image plane 67 and extends in the direction of the y-axis 32 and line segment PQ 49 is the projection of P'Q' 39 on to the page surface 142. It should be noted that line segment PQ 49 on the page surface 142 in FIG. 22 also corresponds to line segment PQ 49 on the rectangular net 134 in FIG. 19.

In the projection diagram of FIG. 22, S corresponds to the lens 66 which is used to capture the image 131 of the page surface 142 of the imaged book. The optical axis of lens 66, which corresponds to the z-axis 65 in FIG. 22, intersects image plane 67 at O and page surface 142 at R. H and I are the foot points of P and Q on the z-axis 65, respectively. Thus, if $\angle PRH = \theta$, by geometry, the following equations may be derived:

$$\frac{SO}{SH} = \frac{P'O}{PH} \text{ and } \frac{SO}{SI} = \frac{Q'O}{QI}$$

To solve for P'O, $$P'O = \frac{SO \cdot PH}{SH} = \frac{SO \cdot PR\sin\theta}{SR + RH} = \frac{SO \cdot PR\sin\theta}{SR + PR\cos\theta} \quad (1)$$

Further, by setting SO=f, SR=d, P'O=$y_{p'}$, which is the y-coordinate of point P' in FIG. 18, PR=$y_p$, which is the y-coordinate of point P in FIG. 19, then equation (1) can be rewritten as $$y_{p'} = \frac{f y_p \sin\theta}{d + y_p \cos\theta} \quad (2)$$

Here f, d, and θ can be considered constants if it is assumed that the distance from the camera lens 66 to every point on the book is the same. Therefore, equation (2) can be simplified by letting $$a = \frac{d}{f\sin\theta}, \quad b = \frac{\cos\theta}{f\sin\theta}$$

Substituting a and b into equation (2) results in equation (3) below.

$$y_{p'} = \frac{y_p}{a + b y_p} \quad (3)$$

Equation (3) is the transform function for the y-coordinate between P and P'. Analogously, by setting Q'O=$y_{q'}$, QR=$y_q$, then an equation for Q and Q' can be derived:

$$y_{q'} = \frac{y_q}{a + b y_q} \quad (4)$$

Referring back to FIG. 19, let $P_0, P_1, P_2, \ldots P_n$ be n+1 points separated evenly on line segment PQ 49. Each point $P_i$ has a y coordinate which can be represented by the y coordinates of point P and point Q. For each point $P_i$, we have:

$$y_i = y_q + \frac{i}{n}(y_p - y_q)$$

where i is 0, 1, 2, . . . n. Combining with Equation (4), we now have all the y coordinates on the image plane $P_0', P_1', \ldots P_n'$:

$$y_{i'} = \frac{y_i}{a + b y_i} \quad (5)$$

Using equation (5) the line segment P'Q' 39 is divided into n sections. Dividing all the line segments along the y-axis, the disproportional rectangular net 134 in FIG. 19 is set up by pixel-to-pixel mapping from the curved coordinate net 132 of FIG. 18.

Although the rectangular net 134 in FIG. 19 has parallel vertical line segments 43-44, 47-49 and parallel horizontal line segments 45, 46, the space between line segments 43 and 47 are larger than the space between y-axis 42 and line segment 48. Therefore, the next step 12 in the dewarping process is to adjust the width between the parallel vertical line segments 43, 44, 47-49 of the disproportional rectangular net 134.

Figure 23:
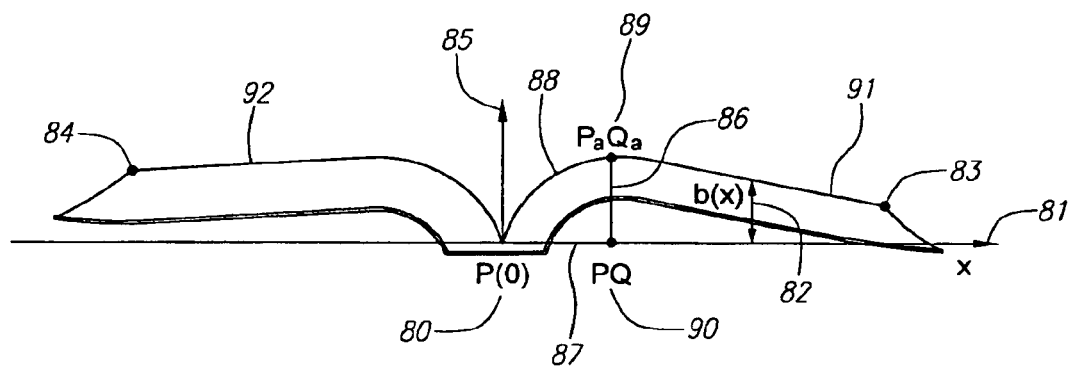
FIG. 23 depicts a side view of an opened book for illustrating a preferred model for performing the adjustment step of FIG. 14.

Referring to FIG. 23, consider the book surface of the page as a cylinder-like surface, if the book is viewed from the bottom side, it should have a right curved page surface 91 and a left curved page surface 92. In FIG. 23, the book spine 80 is located at the origin and the book is located on the x-y plane. The book side edges 83, 84 are shown as dots from side view. Line segment $P_a Q_a$ 89 is also shown as a dot that has a distance $b_{pq}$ 86 from PQ 90 (also shown as a dot) on the x-axis 81. To consider the right page and left page separately, we use an undetermined function b(x) 82 may be used to represent every point on the right curved book page surface 91. Therefore, at the origin point 80, b(0)=0.

Figure 24:
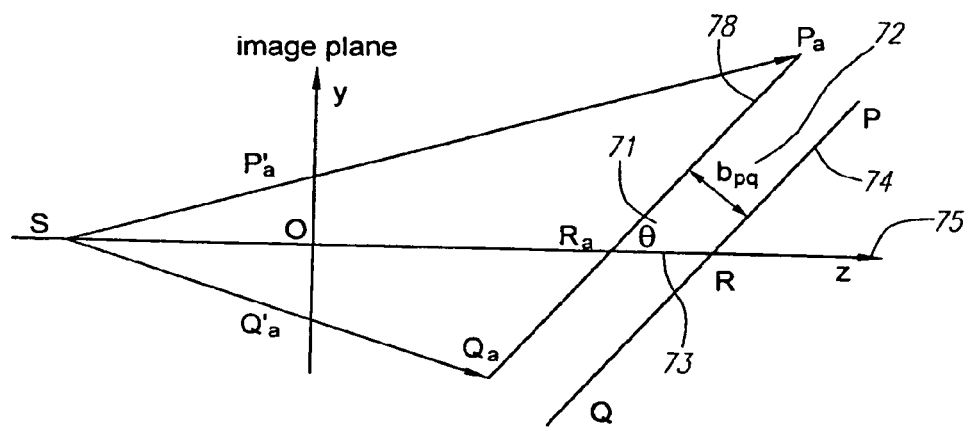
FIG. 24 depicts a projection diagram for further illustrating a method for performing the adjustment step of FIG. 14.

Referring to FIG. 24 for a detailed description of the adjustment for the lens to object distance. In FIG. 24, $P_a Q_a$ 78 is a line segment on the curved page surface 142 and $R_a$ is the point on the intersection of $P_a Q_a$ 78 and the z-axis 75. $P_a Q_a$ 78 and z-axis 75 form an angle of θ 71. The adjusted line segment $P_a Q_a$ 78 is parallel to PQ 74 where line segment PQ 74 intersects the z-axis 75 at R. The distance between line segment PQ 74 and line segment $P_a Q_a$ 78 is $b_{pq}$ 72. Therefore, by trigonometry, the length of line segment $R_a R$ 73 is $b_{pq}/\sin\theta$.

Referring back to FIG. 22, we can now adjust the distance from the lens 66 to page surface 142 by subtracting b(x)/sin θ from SR since there is a distance from the page surface 142 to the table except at the book spine and book side edges. As a result, d(x)=d(0)−b(x)/sin θ. Substituting this equation into equation (2), yields:

$$y_{p'}(x) = \frac{f y_p \sin\theta}{d(0) + y_p \cos\theta - b(x)/\sin\theta}$$

$$y_{p'}(x) - y_{p'}(0) = \frac{f y_p \sin\theta}{d(0) + y_p \cos\theta - b(x)/\sin\theta} - \frac{f y_p \sin\theta}{d(0) + y_p \cos\theta}$$

$$= \frac{f y_p b(x)}{(d(0) + y_p \cos\theta)(d(0) + y_p \cos\theta - b(x)/\sin\theta)}$$

Assuming that $b(x) \ll d + y_p \cos\theta$, $$y_{p'}(x) - y_{p'}(0) = \frac{f y_p b(x)}{(d(0) + y_p\cos\theta)(d(0) + y_p\cos\theta)} \quad (6)$$

$$y_{p'}(x) - y_{p'}(0) = C \cdot b(x)$$

where C is a constant since f, d(0), θ and y, are all constants once the image is captured. And $y_p(x)$ is the line function of top edge 36 which has been decided in step 320, 335. By applying equation (6), one can now solve for b(x).

Referring back to FIG. 23, the x-axis 81 may be divided into many small segments. For each small segment Δx 87 on x-axis 81, there is a corresponding arc 88 on page surface 91. The length of the arc 88 approached a value ΔArc which is equal to $(\Delta x^2 + \Delta b^2(x))^{1/2}$ if Δx is very small. Thus, by letting j(x) correspond to the length of an arc from the origin 80 to any point on the page surface 91, then the following equation can be written:

$$j(x) = \int_0^x \Delta Arc = \int_0^x \sqrt{1 + d(b(x) \cdot b(x))/dx} \cdot dx$$

A similar formula may be written for page surface 92. Once j(x) is obtained, the rectangular net 134 in FIG. 19 can be adjusted to a well-proportioned rectangular net 136 as shown in FIG. 21.

In FIG. 21, the book page shows the result of a de-warping transform from the book page in FIG. 18. These results were obtained using an image with a resolution of 2304×1704 and proximately 200 dpi. The distance between the lens and the page surface was about 50 cm. The angle between the lens and book surface was less than 30 degrees. Further, the resulting OCR rate was about 90%.

While the above-described dewarping process works best when the background is a dark color, other backgrounds may be employed. The dewarping embodiment just described is very useful for removing distortions from an imaged document that has both curvature and perspective distortions, even when the imaged document comprises relatively few text lines.

A preferred method for generating the curved coordinate net 132 is now described in connection with FIGS. 15 and 16.

When a book is opened, the page surfaces typically do not lie flat, particularly when the book is thick, and, as a result, the text lines become curved. In the method of FIG. 15, the longest lines of text on an imaged page are located. A transform based on the most widely separated, longest lines of text is then performed, which in turn may be used to generate the curved coordinate net 132.

Figure 15:
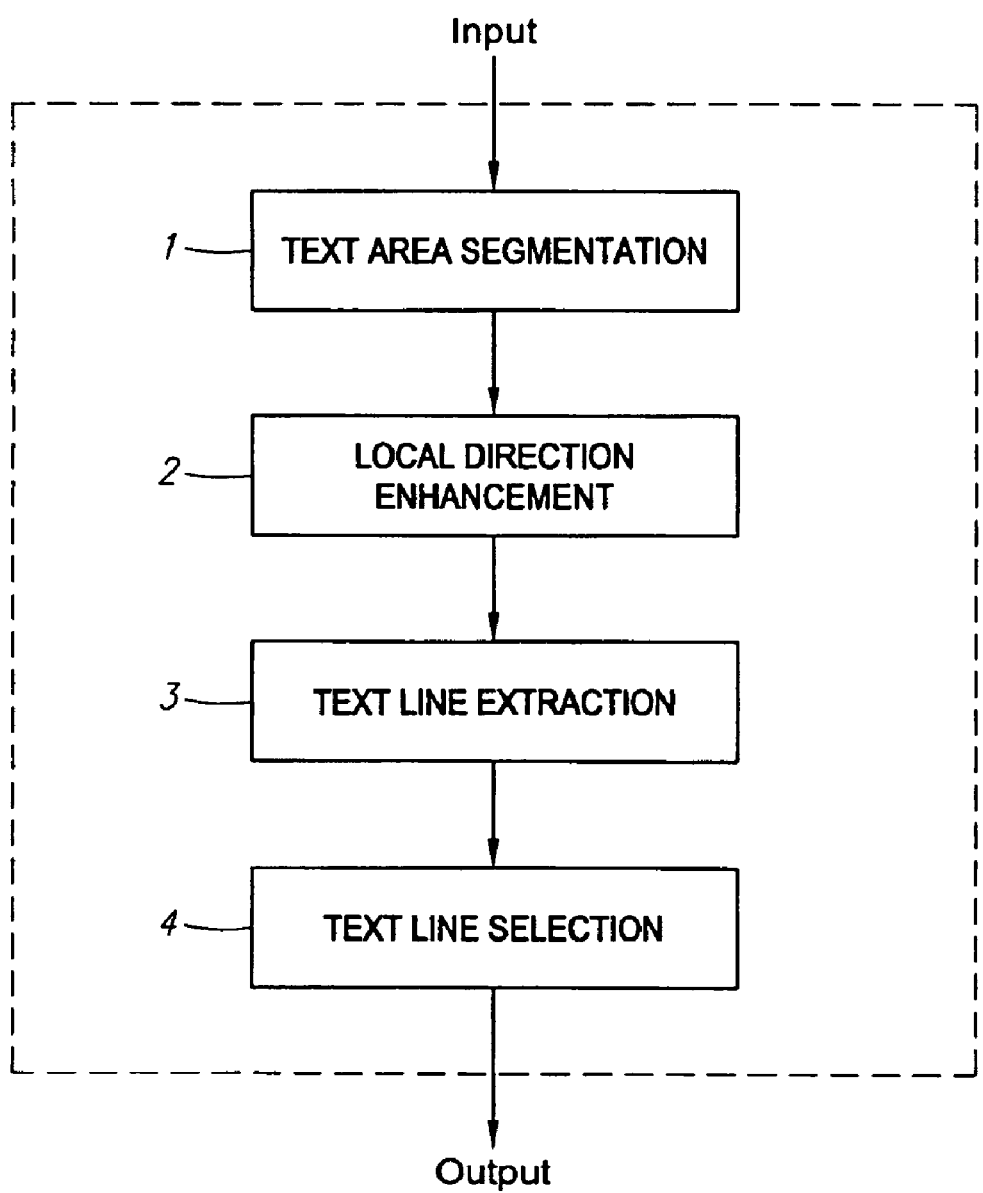
FIG. 15 depicts a flowchart of a method for generating a curved coordinate net for an image of a warped document.

The method of generating the curved coordinate net 132 shown in FIG. 15 includes four major steps. First, a step of text area segmentation 1 is used to separate the area in a stored image of a book page that contains text. Second, a step of local direction enhancement 2 is used to reveal the hidden text lines. Third, a text line extraction step 3 is used to estimate a skeleton curve for each text line. The last step is text line collection 4, which is used to select a suitable polynomial function to represent the text lines.

In one embodiment, the text area of an imaged document is assumed to comprise a large area of light space with some dark characters or figures on it. In order to separate the text area in step 1, a small size thumbnail of the original image is generated. Each pixel in the thumbnail is set to black if all the pixels that it represents in the original image are dark, otherwise that pixel is set to white. With the thumbnail image, it is then possible to readily search for the largest connected white pixels, which will correspond to the page area of the imaged book or document. This process separates the image of the book page or document from its background, and thus constitutes an alternative method of performing the segmentation steps 230, 335. Once the book page or document is separated from its background, the text area on the imaged page is identified. To accomplish this, another thumbnail may be generated, preferably using an inverse sampling method, namely, each pixel in the thumbnail is set to white if it is in the imaged page area and the area it covers in the original image has a high intensity variance and at least one dark pixel. As a result, white areas in this thumbnail represent the text areas in the original image. In another embodiment illustrated in FIG. 25, a thumbnail 450 is generated wherein each pixel in the thumbnail 450 is set to black if it is in the page area and the area it covers in the original image has a high intensity variance and at least one dark pixel. As a result, black areas in this thumbnail 450 represent the text areas in the original image.

After the text area is obtained, the text area segmentation step 1 is ready to be performed. This is especially useful when dealing with an image of an opened book, which will typically comprise two pages. It is also useful for segmenting columns of text on an imaged page. In one embodiment, the segmentation is performed by scanning the thumbnail 450 along vertical lines 454 of the page area in the thumbnail image 450 to identify the gaps between text areas by detecting whether every pixel of the same vertical line is a white pixel (or dark pixel if the inverse sampling method is used). If the answer is positive, then the entire vertical line is lying on a gap between text area. A proper threshold will separate most text areas (e.g., one imaged page from another imaged page when two pages of a book are captured in the same image and/or some columns of text on the same imaged page).

In step 2, a local direction enhancement is preferably performed. Although people read books "line by line," there is no geometrical lines in a text line. Instead, people understand that two different characters belong to the same text line because of the densities of characters, their directions, and text meanings. However, a computer does not know the direction of characters and their meanings. The only information available for an image processor is the local direction of characters based on their densities. In one embodiment, the local direction enhancement step 2 is performed to reveal the hidden text lines by computing the densities of each character. FIG. 16 shows a flowchart of a process for performing the local direction enhancement step 2, which further contains four sub-steps.

First, a text line distance detection step 5 is preferably performed to detect the height of text lines. The height of text lines is an important factor in determining the compression rate for the next step 6. In step 6, the input image is compressed and converted into a binary image. Next, in step 7 a process is used to compute and enhance a direction-matrix, which represents the local direction of each pixel in an image. In one embodiment, sixteen predefined directional templates are used to estimate the direction for each pixel. After the direction-matrix is calculated for each pixel, a smoothing algorithm is used to eliminate noise in the matrix. In step 8, a direction-matrix-based enhancement is performed. The direction-matrix and the original image are used to do local direction enhancement so as to eliminate any gaps between words in the same text line and thereby generate a continuous text line. A gray scale image is obtained from the above described enhancement process, which is subsequently processed in the text line extraction step 3 of FIG. 15.

In the text line extraction step 3, the image from step 2 is converted into a binary image. A detail description for each of the sub-steps 5,6,7,8 of the local direction enhancement step 2 is provided below.

Figure 16:
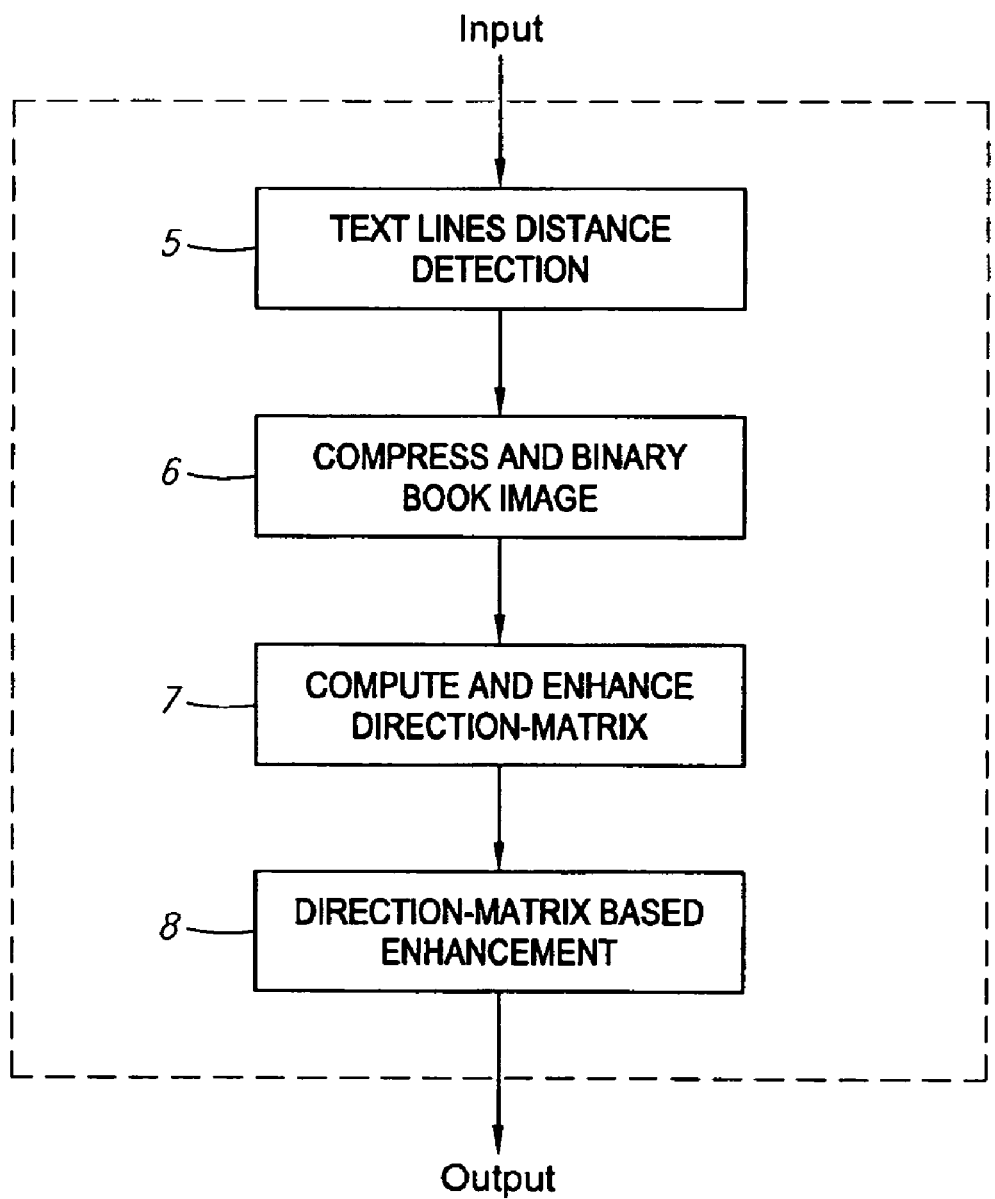
FIG. 16 depicts a flowchart of one method of performing the local direction enhancement step illustrated in FIG. 15.

Preferably the text line distance detection step 5 of FIG. 16 is performed by generating a thumbnail image similar to that used in the text area detection step 1. In one embodiment, a thumbnail image which is four times higher in vertical resolution than that in step 1 is used. The text area is then divided into a plurality of smaller segments. This is illustrated using FIGS. 26A and 26B. FIG. 26A depicts a small segment 460 of a text image. FIG. 26B depicts a thumbnail image of the image in FIG. 26A. For each thumbnail 464 corresponding to a segment 460 of text area, a rectangular stripe of pixels 462 in the central portion of the thumbnail 464 is selected. This rectangular stripe of pixels 462 is preferably set to have the same height as the segment 460 of text area is being analyzed, but preferable occupies only 1/32 the width of the whole segment 460. Each rectangular stripe 462 is then scanned vertically from top to bottom when scanning each rectangular stripe 46. If there is a pixel which is considered to constitute text, every pixel in the same horizontal level of the scan may also be treated as text. Therefore, many rectangular areas 466 may be generated within the stripe 462. Based on the scan of stripe 462, the number of pixel lines L with at least one black pixel are counted. In addition, the total number of text lines C is counted. Therefore, a rough height of text lines $H_0$ for each text area is equal to L/C for that text area. To make the estimation more accurate, the calculation of height may be repeated while filtering out those lines with a L/C value greater than $2H_0$. This filtering step may be used to get rid of elements such as pictures. The end result of this analysis is the text height H. In the same manner, the average space S between text lines may be calculated. Finally the distance, between text lines is simply the sum of S and H.

In step 6 of FIG. 16, a process to compress the input image and convert it into a binary map is preferably performed. Based on the calculated distance between different text lines from step 5, it is possible to select a compression rate such that the input image can be compressed so that characters in the same line connect together, but characters not in the same line are separated. In one embodiment, a local binary algorithm is then performed. First, the input image is split into small windows according to a desired compression rate. Then, for each window, the darkest pixel is identified. If the gray value of the darkest pixel is greater than a threshold value, or greater than a second threshold value plus the average gray value of the small window, then the gray value for every pixel in the same window is set to 255. Otherwise, every pixel of the window is set to 0.

Figure 27A:
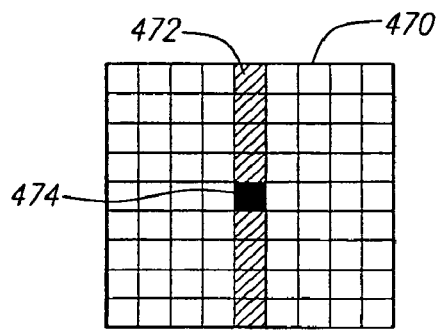
FIGS. 27A-F depict six 9×9 directional templates that may be used in performing the compute and enhance direction-matrix step of FIG. 16.
Figure 27B:
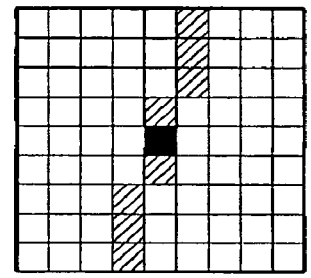
Figure 27C:
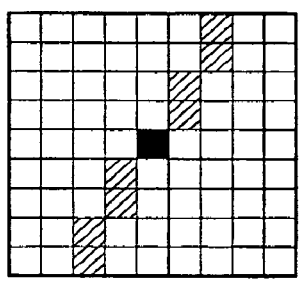
Figure 27D:
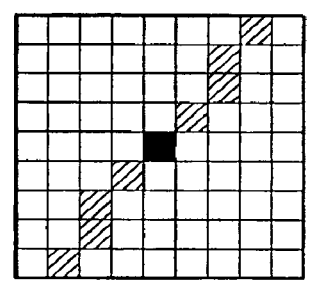
Figure 27E:
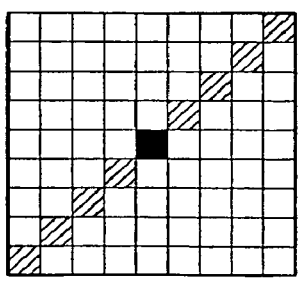
Figure 27F:
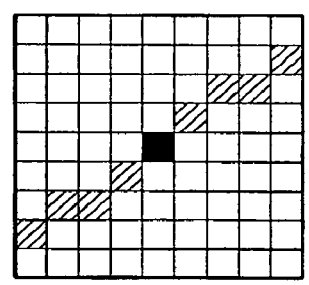

In step 7 of FIG. 16, a process to compute and smooth a direction-matrix is performed. In one embodiment, sixteen predetermined 9×9 directional templates may be used to estimate the direction at each pixel. FIGS. 27A-F depict six out of the sixteen 9×9 directional templates that may be used for performing step 7 of FIG. 16. In FIGS. 27A-F, the black block 474 in the center of the 9×9 directional template 470 represents the central pixel while the eight gray blocks 472 describe a direction of the central pixel. Thus, for example, FIG. 27A represents a text line with a vertical direction while FIG. 27E represents a text line tilting 45 degrees to the horizontal. The patterns of the other ten directional templates that may be used in performing step 7 can be derived from the trend of the first six directional templates as shown in FIGS. 27A-F (i.e., the gray blocks shift clockwise one by one). With these sixteen 9×9 directional templates, the step 7 of computing the direction-matrix may be performed.

First, for each pixel in the imaged page, sixteen sums of gray level values in all sixteen directions provided by the sixteen 9×9 directional templates are calculated. Next the maximum, minimum, and average sum of gray level values, which are denoted by sum_max, sum_min, and sum_avg are determined. Each sum of gray level values is represented by sum of the central pixel (dark block) and eight pixels (gray blocks) defined by one of the sixteen directional templates. The value of sum_max represents the largest of the sixteen sums of gray level values. The value of sum_min is the smallest of the sixteen sums of gray level values. The value of sum_avg is the average of all sixteen sums of gray level values. The direction indicated by the directional template which yields to the sum_min implies that the central pixel is sitting on a text line and direction of the central pixel is represented by that directional template. For the same reason, the direction indicated by the directional template which yields to the sum_max implies that the central pixel is not sitting on a text line and direction of the central pixel is represented by that directional template. From this, the direction of each pixel may be determined.

In one embodiment, the direction of a pixel is set by comparing the gray value of the pixel (i,j) (gray_value (i,j)) as follows: If 9*gray_value (i,j)+sum_max+sum−min>3*sum−avg, than the direction at the pixel is set to the direction of the 9×9 directional template which yielded the sum_max, otherwise, the direction of the pixel is set to the direction of the 9×9 directional template which yielded sum_min. The estimated direction at each pixel forms a direction-matrix. However, due to the complexity of characters in book image, the directions of some pixels may not be correct. For example, the direction of a blank block is useless for revealing text lines. Accordingly, in one embodiment, a smoothing algorithm is used to set the direction of every pixels in the same vertical line to have the same direction. This can be done by performing a voting process, which means that the most common direction among pixels in any vertical line should become the direction of every pixel in the same vertical line.

Figure 13:
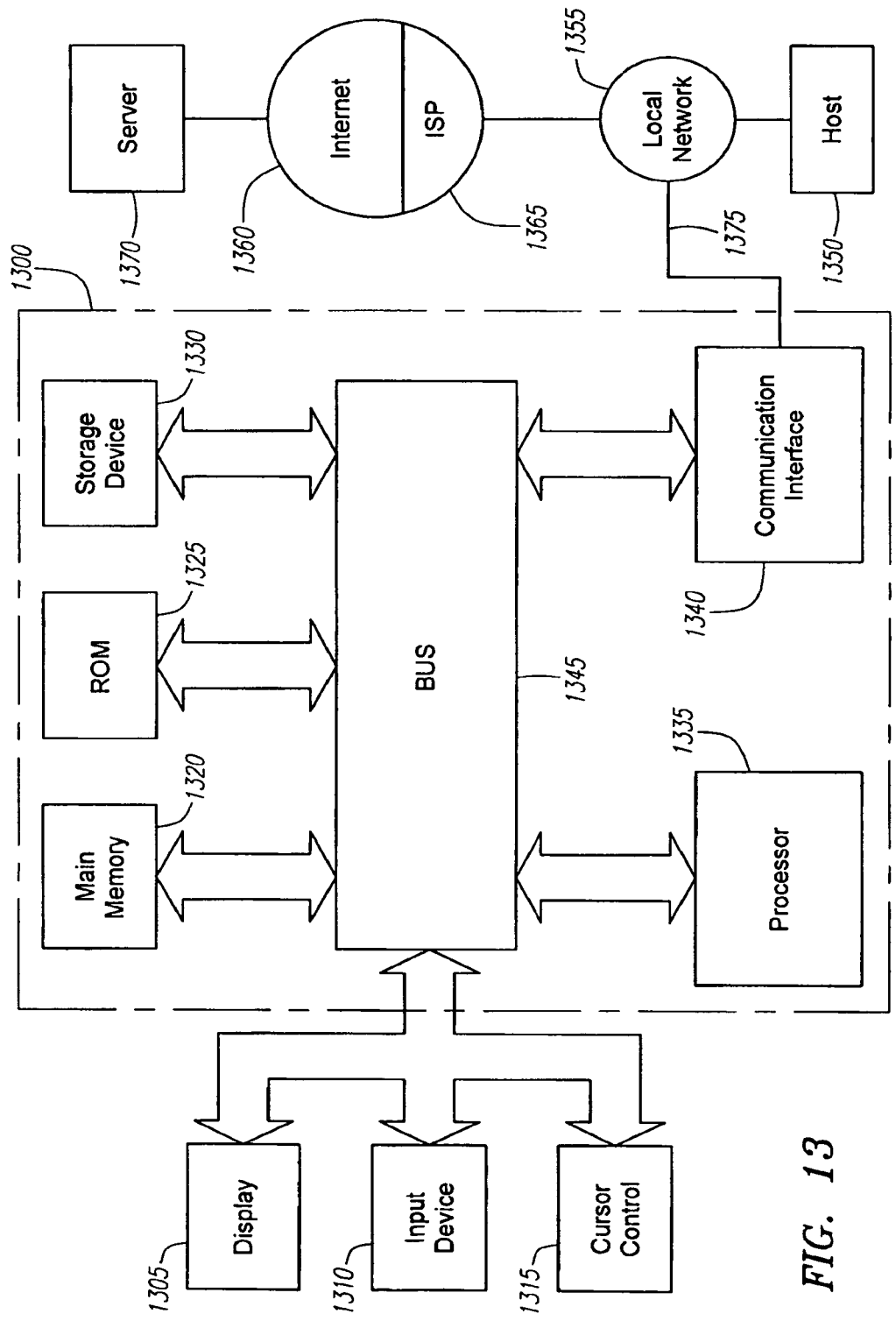
FIG. 13 depicts one embodiment of a system for processing a captured image.

In step 8 of FIG. 16, a process to perform direction matrix based enhancement is performed. FIGS. 28A and 13 are useful for illustrating one embodiment of the direction-matrix based enhancement step 8 of FIG. 16. FIG. 28A depicts a text image. FIG. 28B depicts the direction-matrix generated from the image shown in FIG. 28A following performing the direction-matrix based enhancement steps of FIG. 16.

Knowing the direction of each pixel, gaps 480 between characters belonging to the same text line can be eliminated. This may be accomplished by averaging the gray value of each pixel with its neighborhood pixels and use the averaged gray value to represent the pixel. Then, the gray value is set to either a 0 or 255 depending on the threshold value. In one embodiment, the gray values is averaged with eight pixels closest to it. After this process, most gaps between neighbor characters are filled and skeletons of text lines 482 are generated, thereby resulting in the enhanced image shown in FIG. 28B.

Figure 29A:
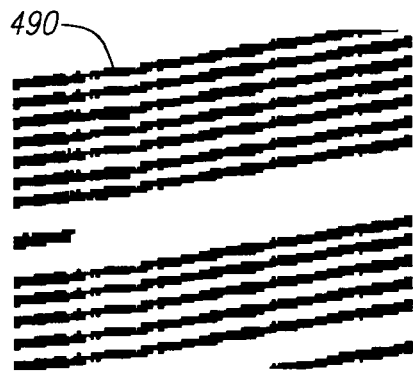
FIG. 29A depicts an image of skeletons of text lines used for further illustrating one method for performing the text line extraction step of FIG. 15.
Figure 29B:
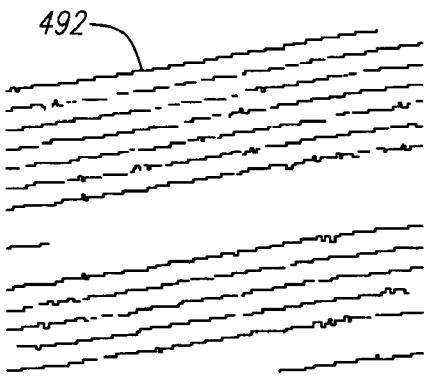
FIG. 29B depicts an example of skeleton of thinned text lines that may be generated from the image in FIG. 29B during one method of the text line extraction step of FIG. 15.

Referring back to FIG. 15, the step of text line extraction 3 is now used to estimate the skeleton curve for each text line revealed in the previous step. Referring to FIG. 29A, the text lines 490 revealed in the previous step are too thick to extract. Therefore, a thinning process is preferably performed on the text lines 490 to generate the enhanced text lines 492 shown in FIG. 29B. The thinning process is performed to make the height of each enhanced text line 492 to be the size of one pixel. This may be accomplished by scanning vertically pixel-wise on the skeletons of text lines 490 in FIG. 29A. For example, when a dark pixel is found, its y-coordinate may be recorded as y_start. Then the pixels below it are scanned one by one until a white pixel is found. A y_end may be recorded for the pixel just above the white pixel. Therefore, the y-coordinate for the extracted thinning line may be set as (y_start+y_end)/2. The result of this thinning process is enhanced text lines 492 as shown in FIG. 29B. A text line tracing process that includes the following sub-steps is then preferably performed to complete step 3.

Figure 30:
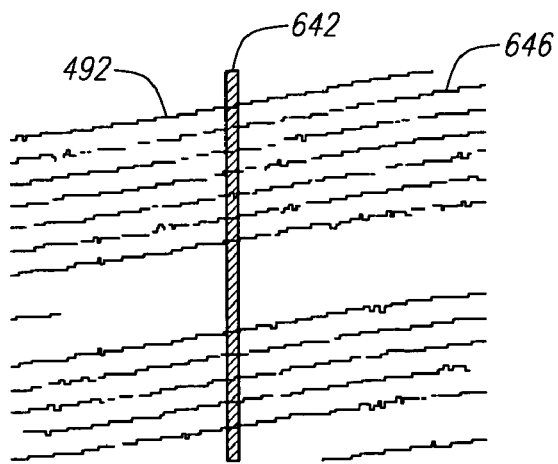
FIG. 30 depicts a vertical detection band that may be used during one method to extract the lines of text from the image of FIG. 29B during the text line extraction step of FIG. 15.

FIG. 30 depicts skeletons of thinned text lines 492 with a vertical detection band 492 that may be used for performing the text line tracing process. In one embodiment, each thinned text line 492 is detected by setting a vertical detection-band 642 at the middle of the page. This will detect most of the long text lines 646. By detecting whether the gray values at pixels on the detection-band are black, the middle point of each text line can be collected. After getting every middle point of text lines, each text line from the middle point is traced on both left and right directions. To trace a text line in the left direction, a trace line of slope K (starting from 0) to trace 0 to 12 pixels on the left. If there is a black pixel within 3 pixels above or below this trace line, this point is regarded as a point of the text line. This point is recorded and the next point on the line is determined. When the new point is found, a new slop is calculated for purpose of continuing the tracing process. A new slope K can be decided by the equation of K=10*K_previous/11+10*(y_new−y_previous)/(x_new−x_previous), where x_previous and y_previous are the x and y coordinate of the previously collected point on a text line and x_new and y_new are the x and y coordinate of the currently collected point on a text line. This process can adjust the direction of tracing and will fit the varieties of the warping of text lines. The process is repeated until meeting the edge of the text line or running out of points. While the above process is for tracing the left part of a text line, the trace for the right part is symmetrical. If there are still some non-continuous text lines after this process, a self-adaptive collection algorithm can be used to trace each text line.

Figures 31A, 31B:
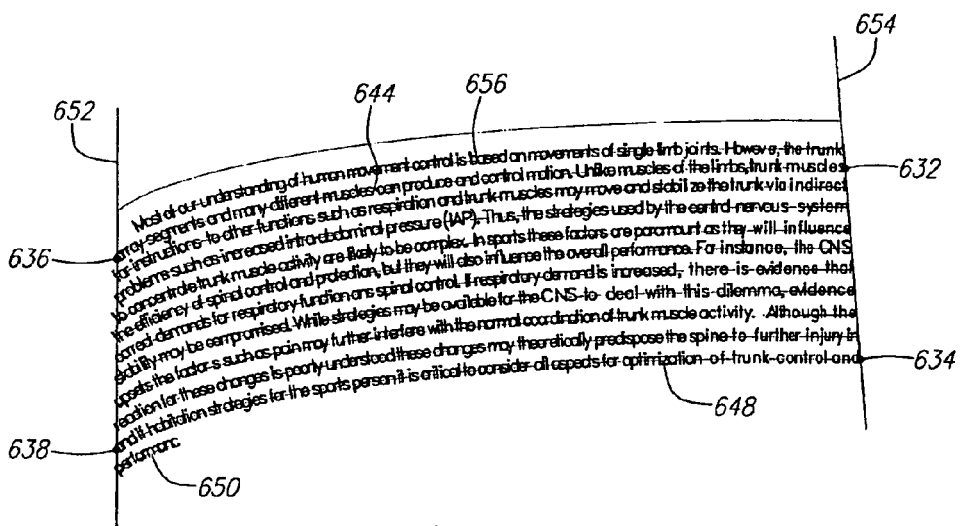
FIGS. 31A-B depicts text lines image for further illustrating another method for performing the text line extraction step of FIG. 15.

Step 4 in FIG. 15 comprises the step of text lines selection and calculation of a polynomial for generating curved coordinate net 132. FIGS. 31A and 31B are useful for illustrating one method of performing this step. FIG. 31A depicts a text line image and FIG. 31B depicts a text line image with an extracted text line overlay on it. In step 4, text lines 650 that are shorter than a predefined amount of the longest text lines 644, 648 are removed. Preferably those that are less than half of the length of the longest lines 644, 648 are removed. In addition, lines 656 with left indent are also preferably removed. Two of the longest remaining lines 644, 648 are selected. In one embodiment, two of the most separated lines are used. The end points 632, 634, 636, 638 of these two lines 644, 648 determine the two text edges on the left side 652 and the right side 654 of the imaged document. The left edge line 652 and the right edge line 654 should intersect on a vanishing point which is outside of the figure and is not shown. Finally, a polynomial function may be used to model the selected text lines 644, 648. In one embodiment, the polynomial function is set to the fifth order.

Once the polynomial function for these text lines is obtained, the curved coordinate net 132 can be generated for performing the dewarping process of FIG. 14. In one embodiment, once the polynomial function for these text lines is obtained, a line extension process is performed to extend the selected text lines 644, 648 to their left and right to keep a margin on each side of the text area. The degree of extension may be formularized based on the width of the text area. The extended lines may also be fitted into the polynomial function previously obtained. The two right ends of the extended lines define a line which should pass the vanishing point and the two left ends of the extended lines also define a line which should also pass the vanishing point. Once the extended lines are obtained, the curved coordinate net 132 can be generated for performing the dewarping process of FIG. 14.

Another preferred method for generating the curved coordinate net 132 is now described in connection with FIG. 17.

Figure 17:
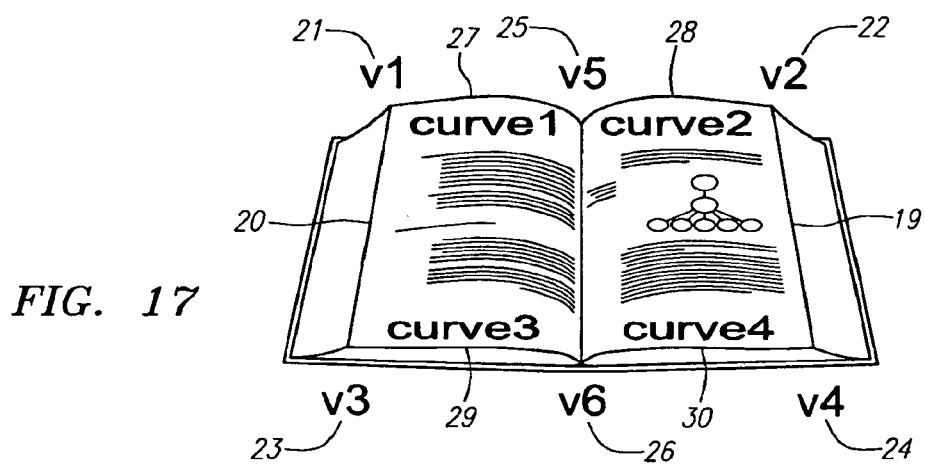
FIG. 17 depicts a segmented original image to be corrected by the image dewarping technique of FIG. 14 and illustrates an alternative method of applying a curved coordinate net to an image of a warped document.
Figure 32:
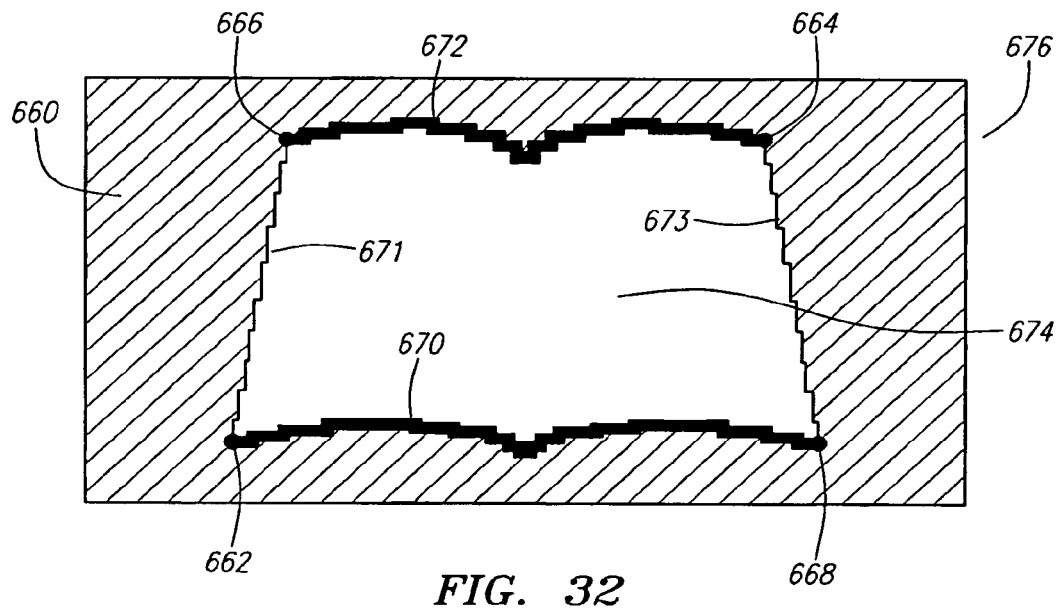
FIG. 32 depicts an example of an image extracted from the segmented image of FIG. 17 for use in one image dewarping technique according to FIG. 14.
Figure 33:
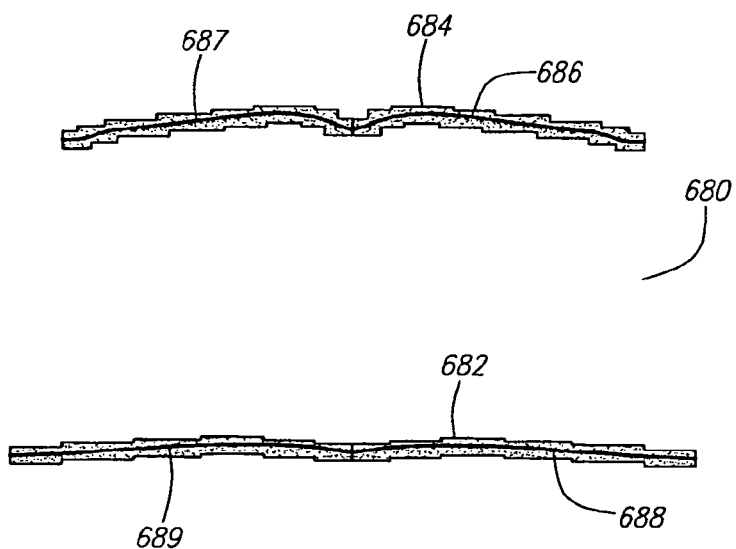
FIG. 33 depicts an image of extracted edge lines generated from the image in FIG. 32 for use in a image dewarping technique of FIG. 14.

The method of FIG. 17 can extract the corners and most importantly, the functions of the curved top and bottom edges of a curved page surface of a book. Referring to FIG. 17, the six corners 21-26 of the pages of an imaged book may be calculated by finding the intersecting points of edge lines 19, 20, 27-30. Notice that in FIG. 17, top edges 27, 28 are curved lines and so are the bottom edges 29, 30. Two side edges 19, 20 are straight lines. In one embodiment, the calculation of the six corners 21-26 and edge lines 19, 20, 27-30 is determined as described below and illustrated in FIGS. 32 and 33. First, the resolution of the original image is reduced, preferably to 100×100 and then converted into a black and white image 676 by using a gray level threshold. The gray area 660 represents background and the white area 674 represents a page area. Second, the borders 670-673 of the white area are found and the vertices 662, 664, 666, 668 of the four borders 670-673 specified. Third, the top border 672 and bottom border 670 are used as guidelines to open a series of small windows along the top border 672 and bottom border 670. Fourth, a Canny edge detection is performed on the small windows and the detection result is combined into two curved images, one for the top edge 684 and one for the bottom edge 682. These two curved images 684, 682 desirably have a width the same as the width of the small window mentioned above. Fifth, the edges of the images are traced to have top curved edges 686, 687 and bottom curved edges 688, 689.

Referring back to FIG. 17, the top curved edges are 27, 28 and bottom curved edges are 29, 30. The end points of the top curved edge and bottom curved edge define the four corners 21-24. Connecting the two right corners 22, 24 will make a right edge 19 of the book and connecting the two left corners 21, 23 will make a left edge 20 of the book. The maximum curvature point 25, 26 in each of the top curved edge 27, 28 and bottom curved edge 29, 30 becomes the two other corners 25, 26 and a connection between these two corners 25, 26 comprises the spine of the book and the y-axis in the curved coordinate net 132. Projections of the right edge 19 and left edge 20 can be used to find the vanishing point and hence generate the curved coordinate net 132.

The approaches described herein for processing a captured image are applicable to any type of processing application and (without limitation) are particularly well suited for computer-based applications for processing captured images. The approaches described herein may be implemented in hardware circuitry, in computer software, or a combination of hardware circuitry and computer software and is not limited to a particular hardware or software implementation.

FIG. 13 is a block diagram that illustrates a computer system 1300 upon which the above-described embodiments of the invention may be implemented. Computer system 1300 includes a bus 1345 or other communication mechanism for communicating information, and a processor 1335 coupled with bus 1345 for processing information. Computer system 1300 also includes a main memory 1320, such as a random access memory (RAM) or other dynamic storage device, coupled to bus 1345 for storing information and instructions to be executed by processor 1335. Main memory 1320 also may be used for storing temporary variables or other intermediate information during execution of instructions to be executed by processor 1335. Computer system 1300 further includes a read only memory (ROM) 1325 or other static storage device coupled to bus 1345 for storing static information and instructions for processor 1335. A storage device 1330, such as a magnetic disk or optical disk, is provided and coupled to bus 1345 for storing information and instructions.

Computer system 1300 may be coupled via bus 1345 to a display 1305, such as a cathode ray tube (CRT), for displaying information to a computer user. An input device 1310, including alphanumeric and other keys, is coupled to bus 1345 for communicating information and command selections to processor 1335. Another type of user input device is cursor control 1315, such as a mouse, a trackball, or cursor direction keys for communication of direction information and command selections to processor 1335 and for controlling cursor movement on display 1305. This input device typically has two degrees of freedom in two axes, a first axis (e.g. x) and a second axis (e.g. y), that allows the device to specify positions in a plane.

The methods described herein are related to the use of computer system 1300 for processing a captured image. According to one embodiment, the processing of the captured image is provided by computer system 1300 in response to processor 1335 executing one or more sequences of one or more instructions contained in main memory 1320. Such instructions may be read into main memory 1320 from another computer-readable medium, such as storage device 1330. Execution of the sequences of instructions contained in main memory 1320 causes processor 1335 to perform the process steps described herein. One or more processors in a multi-processing arrangement may also be employed to execute the sequences of instructions contained in main memory 1320. In alternative embodiments, hard-wired circuitry may be used in place of or in combination with software instructions to implement the embodiments described herein. Thus, embodiments described herein are not limited to any specific combination of hardware circuitry and software.

The term "computer-readable medium" as used herein refers to any medium that participates in providing instructions to processor 1335 for execution. Such a medium may take many forms, including, but limited to, non-volatile media, volatile media, and transmission media. Non-volatile media includes, for example, optical or magnetic disks, such as storage device 1330. Volatile media includes dynamic memory, such as main memory 1320. Transmission media includes coaxial cables, copper wire and fiber optics, including the wires that comprise bus 1345. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1335 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1345 can receive data carried in the infrared signal and place the data on bus 1345. Bus 1345 carries the data to main memory 1320, from which processor 1335 retrieves and executes the instructions. The instructions received by main memory 1320 may optionally be stored on storage device 1330 either before or after execution by processor 1335.

Computer system 1300 also includes a communication interface 1340 coupled to bus 1345. Communication interface 1340 provides a two-way data communication coupling to a network link 1375 that is connected to a local network 1355. For example, communication interface 1340 may be an integrated services digital network (ISDN) card or a modem to provide a data communication to a corresponding type of telephone lines. As another example, communication interface 1340 may be a local area network (LAN) card to provide a data communication connection to a compatible LAN. Wireless links may also be implemented. In any such implementation, communication interface 1340 sends and receives electrical, electromagnetic or optical signals that carry digital data streams representing various types of information.

Network link 1375 typically provides data communication through one or more networks to other data services. For example, network link 1375 may provide a connection through local network 1355 to a host computer 1350 or to data equipment operated by an Internet Service Provider (ISP) 1365. ISP 1365 in turn provides data communication services through the world wide packet data communication network commonly referred to as the "Internet" 1360. Local network 1355 and Internet 1360 both use electrical, electromagnetic or optical signals that carry digital data streams. The signal through the various networks and the signals on network link 1375 and through communication interface 1340, which carry the digital data to and from computer system 1300, are exemplary forms of carrier waves transporting the information.

Computer system 1300 can send messages and receive data, including program code, through the network(s), network link 1375 and communication interface 1340. In the Internet example, a server 1370 might transmit requested code for an application program through Internet 1360, ISP 1365, local network 1355 and communication interfaced 1340. In accordance with the invention, one such downloaded application provides for processing captured images as described herein.

The received code may be executed by processor 1335 as it is received, and/or stored in storage device 1330, or other non-volatile storage for later execution. In this manner, computer system 1300 may obtain application code in the form of a carrier wave.

The invention claimed is:

1. A method for processing a captured image that comprises an imaged document; said method comprising:
   separating text areas from the remainder of said captured image;
   enhancing the direction of text lines in said text areas;
   extracting said text lines;
   selecting from said extracted text lines at least two representative text lines;
   selecting a polynomial function to fit each of said representative text lines; and
   determining a vanishing point based on information derived from said representative text lines.

2. The method recited in claim 1, wherein said representative text lines are the two longest lines among the extracted text lines.

3. The method recited in claim 1, wherein said representative text lines are the two most separated lines among the extracted text lines.

4. The method recited in claim 1, wherein end points of said representative text lines determine a left text edge line and a right text edge line for the imaged document.

5. The method recited in claim 4, wherein the left text edge line and the right text edge line are used to determine the vanishing point.

6. The method recited in claim 5, further comprising the step of:
   forming a curved coordinate net based on the polynomial function of the representative text lines and the determined vanishing point.

7. A method for processing a captured image that comprises an imaged document; said method comprising:
   separating text areas from the remainder of said captured image;
   enhancing the direction of text lines in said text areas;
   extracting said text lines; and
   selecting a polynomial function to fit said text lines,
   wherein said enhancing step further comprising the steps of
      detecting distance between said text lines;
      compressing said captured image under a compression rate;
      computing direction for each pixel in said text lines;
      eliminating gaps between characters so that characters in the same text line connect together, but characters not in the same text line are separated.

8. The method recited in claim 7, wherein the direction for each pixel in said text of lines is determined using a plurality of 9×9 directional templates, where each template comprises a black block in the center representing the pixel and eight gray blocks that extend from the black block that describe a direction of the pixel, and the gray level values are summed for each of the plurality of directional templates to determine the direction of the pixel.

9. The method recited in claim 8, wherein the number of the plurality of 9×9 directional templates is 16.

10. The method recited in claim 8, after the step of computing direction for each pixel in said text lines further comprising the step of:
    setting the direction of every pixels in the same vertical line to have the same direction by using a smoothing algorithm.

11. The method recited in claim 10, wherein the step of setting the direction of every pixels in the same vertical line to have the same direction is performed by a voting process.

\* \* \* \* \*